(12) United States Patent
Higashiyama et al.

(10) Patent No.: US 12,269,616 B2
(45) Date of Patent: Apr. 8, 2025

(54) CAPTURING DEVICE AND SPACECRAFT

(71) Applicant: Mitsubishi Electric Corporation, Tokyo (JP)

(72) Inventors: Daiki Higashiyama, Tokyo (JP); Kazuhide Kodeki, Tokyo (JP); Kazuhiko Fukushima, Tokyo (JP); Naoki Imamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/574,088

(22) PCT Filed: Jul. 6, 2021

(86) PCT No.: PCT/JP2021/025503
§ 371 (c)(1),
(2) Date: Dec. 26, 2023

(87) PCT Pub. No.: WO2023/281632
PCT Pub. Date: Jan. 12, 2023

(65) Prior Publication Data
US 2024/0359828 A1  Oct. 31, 2024

(51) Int. Cl.
*B64G 1/10* (2006.01)
*B64G 1/22* (2006.01)

(52) U.S. Cl.
CPC ......... *B64G 1/1081* (2023.08); *B64G 1/2229* (2023.08)

(58) Field of Classification Search
None
See application file for complete search history.

(56) References Cited

U.S. PATENT DOCUMENTS 5,356,187 A * 10/1994 McCarthy ............ B64G 1/6462
　　　　　　　　　　　　　　　　　　　294/99.1
6,655,637 B1 * 12/2003 Robinson ............. B64G 1/2427
　　　　　　　　　　　　　　　　　　　244/172.4
(Continued)

FOREIGN PATENT DOCUMENTS

| CN | 106976571 A | 7/2017 |
|---|---|---|
| CN | 110182390 A | 8/2019 |
| WO | 2019/161298 A1 | 8/2019 |

OTHER PUBLICATIONS

Extended European Search Report issued Jul. 2, 2024 in European Patent Application No. 21949268.3, 15 pages.
(Continued)

*Primary Examiner* — Joshua J Michener
*Assistant Examiner* — Michael B. Kreiner
(74) *Attorney, Agent, or Firm* — XSENSUS LLP

(57) ABSTRACT

A driving mechanism controller included in a capturing device causes one or more driving mechanisms to spread a tethering member having an elongated shape to the outside of a housing by a target spread length. The driving mechanism controller, when an artificial space object is located in the area surrounded by the tethering member, causes the one or more driving mechanisms to retract the tethering member to the inside of the housing until at least a part of the tethering member comes into contact with the artificial space object. The tethering member is stable in a first shape having a curved section orthogonal to a linear extending direction of the tethering member.

18 Claims, 33 Drawing Sheets

(56) References Cited

U.S. PATENT DOCUMENTS

| | | | | |
|---|---|---|---|---|
| 7,168,660 | B2* | 1/2007 | Bischof | B64G 1/6462 |
| | | | | 244/158.1 |
| 8,052,092 | B2* | 11/2011 | Atmur | B64G 1/648 |
| | | | | 244/172.6 |
| 8,783,622 | B2* | 7/2014 | Vance | B64G 1/6462 |
| | | | | 244/172.6 |
| 9,463,884 | B2* | 10/2016 | Kitazawa | B64G 1/648 |
| 9,840,342 | B2* | 12/2017 | Chambert | B64G 1/6462 |
| 10,611,502 | B2* | 4/2020 | Hensley | H01Q 1/1235 |
| 10,858,125 | B2* | 12/2020 | Vézain | B64G 1/222 |
| 11,142,349 | B2* | 10/2021 | Barnes | B64G 1/222 |
| 11,634,241 | B1* | 4/2023 | Pawelski | B64G 1/1081 |
| | | | | 219/243 |
| 11,661,217 | B2* | 5/2023 | Barnhart | B64G 1/1078 |
| | | | | 244/172.4 |
| 2017/0015444 | A1* | 1/2017 | Okada | B64G 1/36 |
| 2020/0377239 | A1 | 12/2020 | Barnes | |
| 2022/0204187 | A1* | 6/2022 | Richard-Noca | B64G 1/62 |
| 2022/0402632 | A1* | 12/2022 | Yamamoto | B64G 1/1081 |
| 2023/0415923 | A1* | 12/2023 | Scheidegger | B64G 1/6462 |

OTHER PUBLICATIONS

Masuda et al., "Dynamics analysis of a convex spring for space debris capture mechanism", No. 19-2, Proceedings of the 2019, JSME Conference on Robotics and Mechatronics, Hiroshima, Japan, Jun. 5-8, 2019, 04 pages including English Abstract.

International Search Report and Written Opinion mailed on Sep. 21, 2021, received for PCT Application PCT/JP2021/025503, filed on Jul. 6, 2021, 08 pages including English Translation.

* cited by examiner

FIG.5
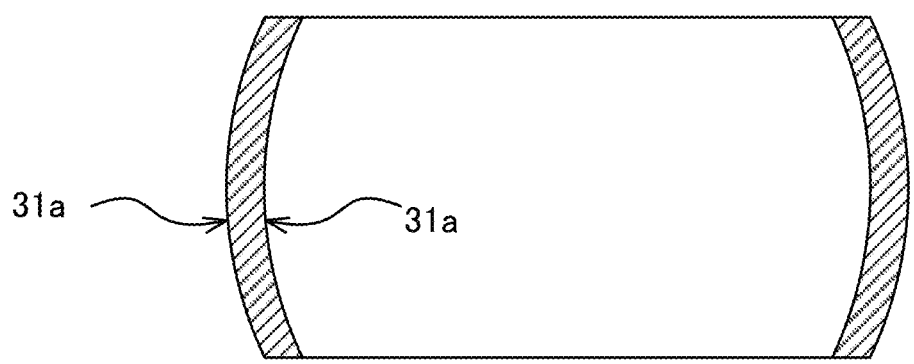
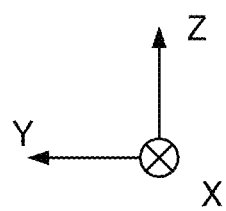

FIG.6
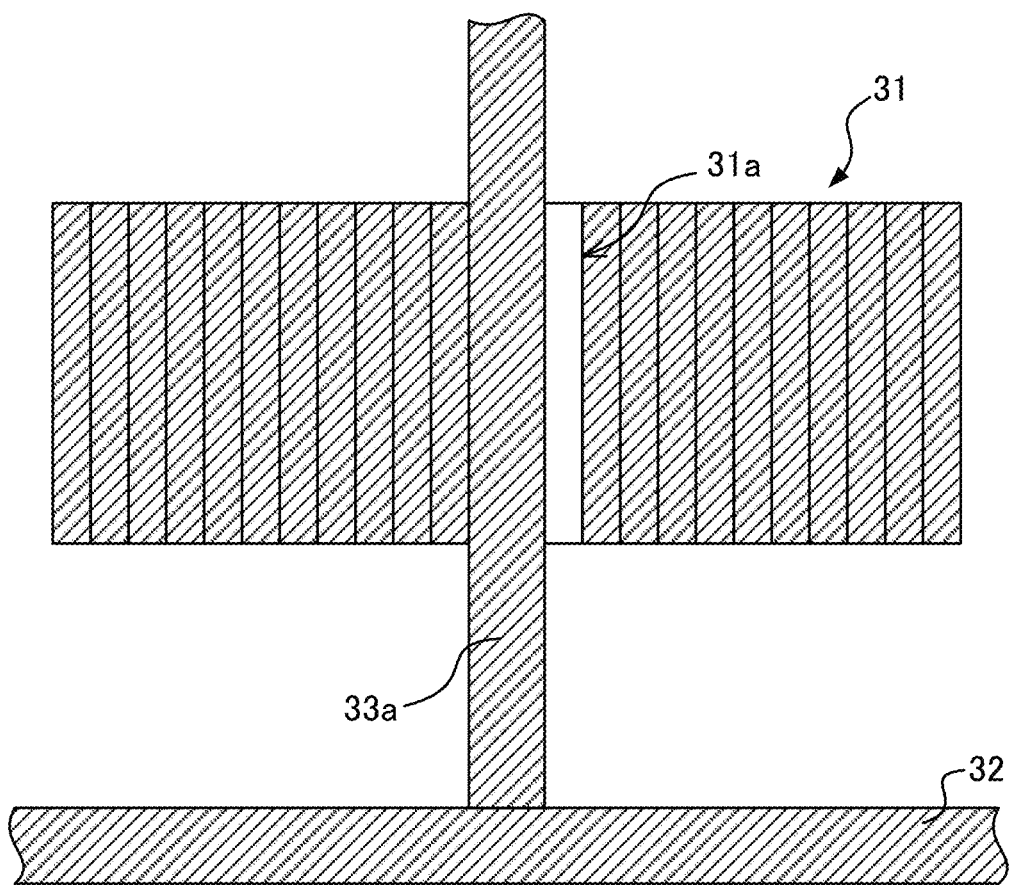
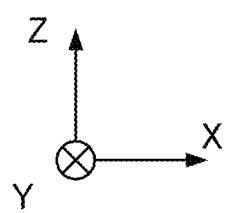

FIG.16
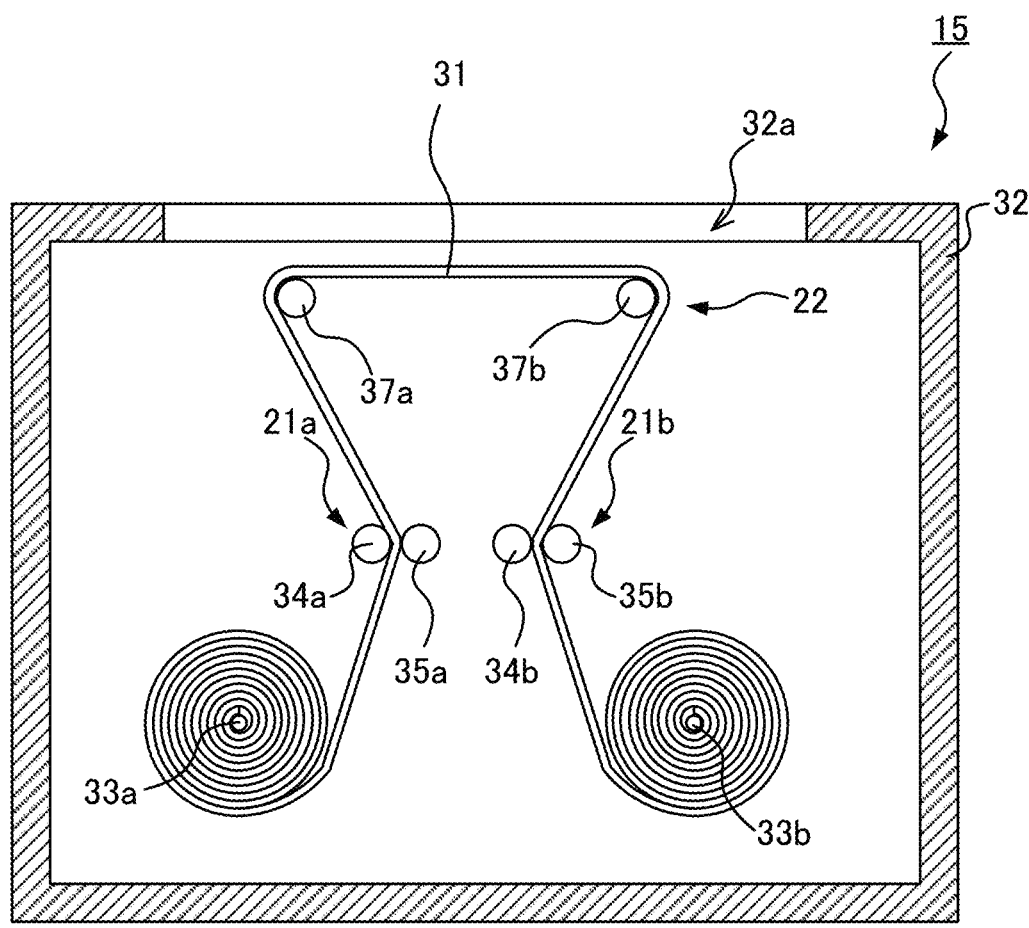
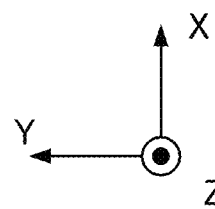

FIG.21
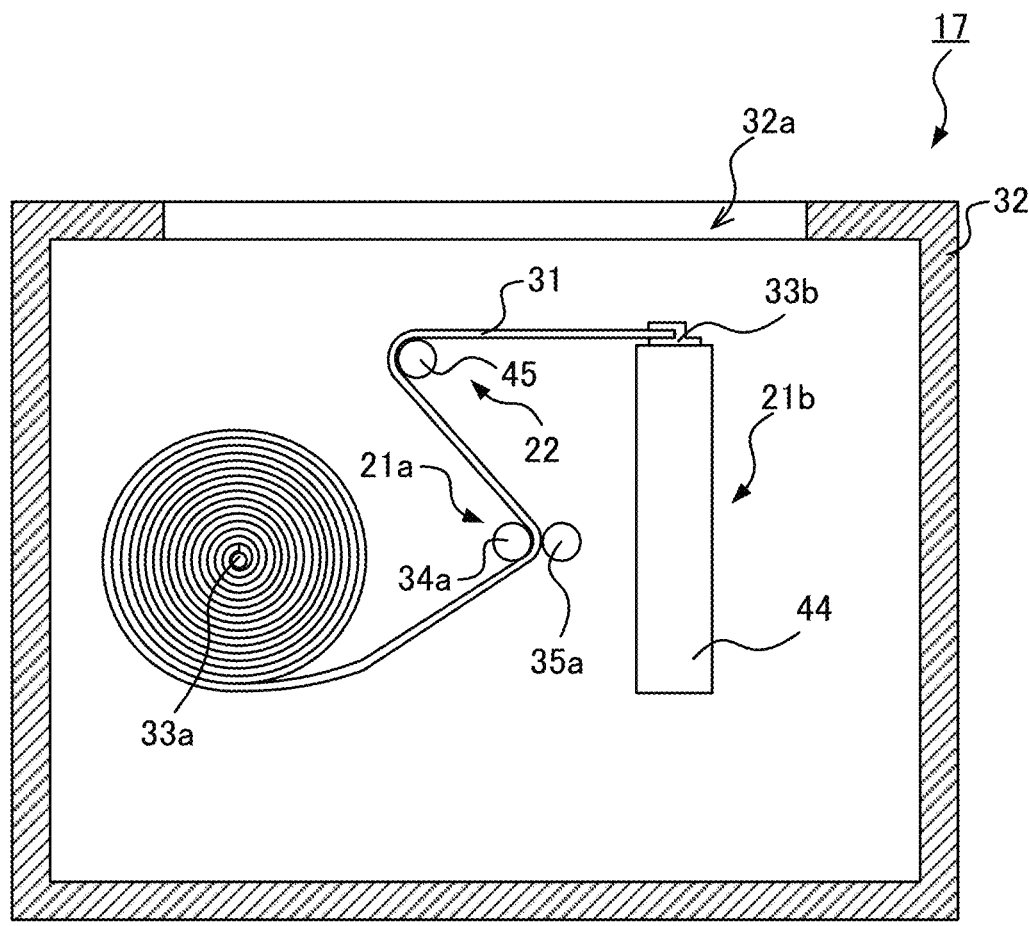
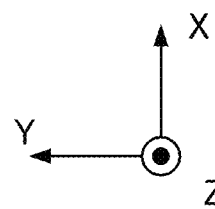

FIG.24
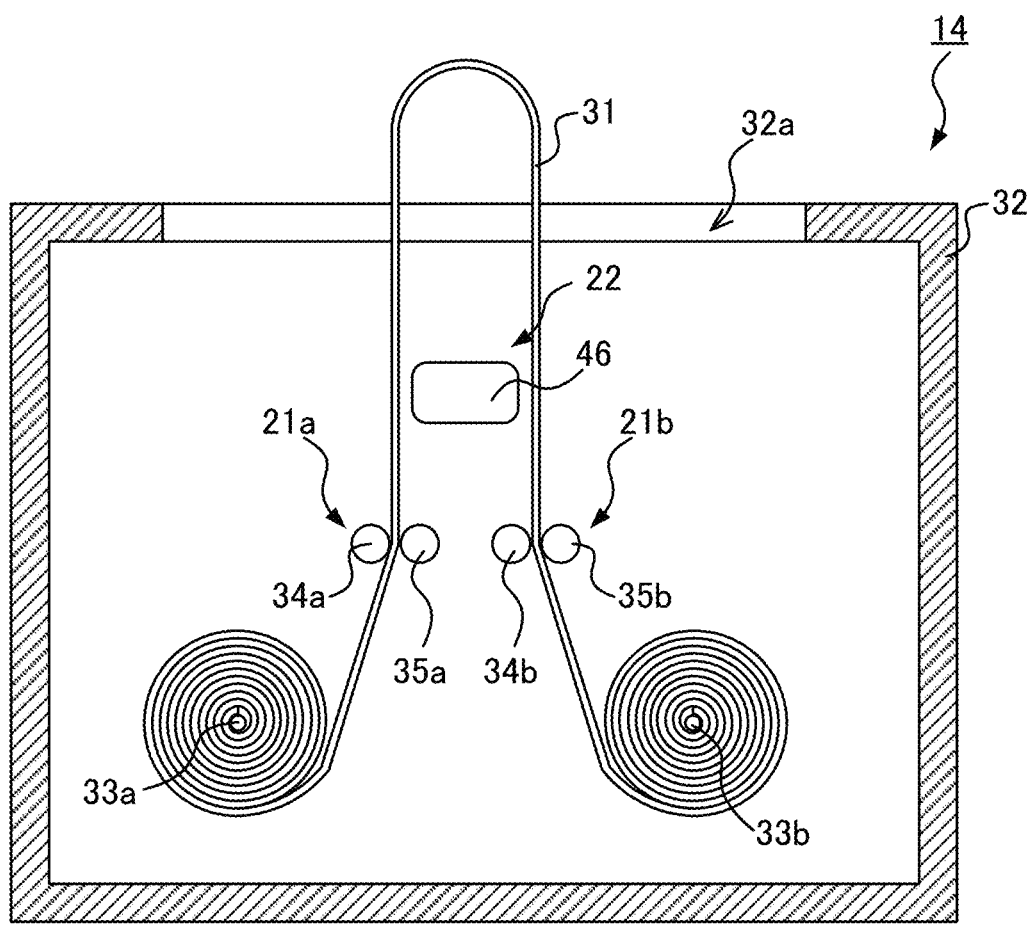
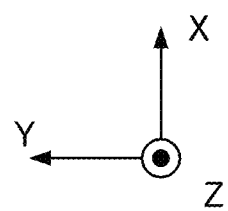

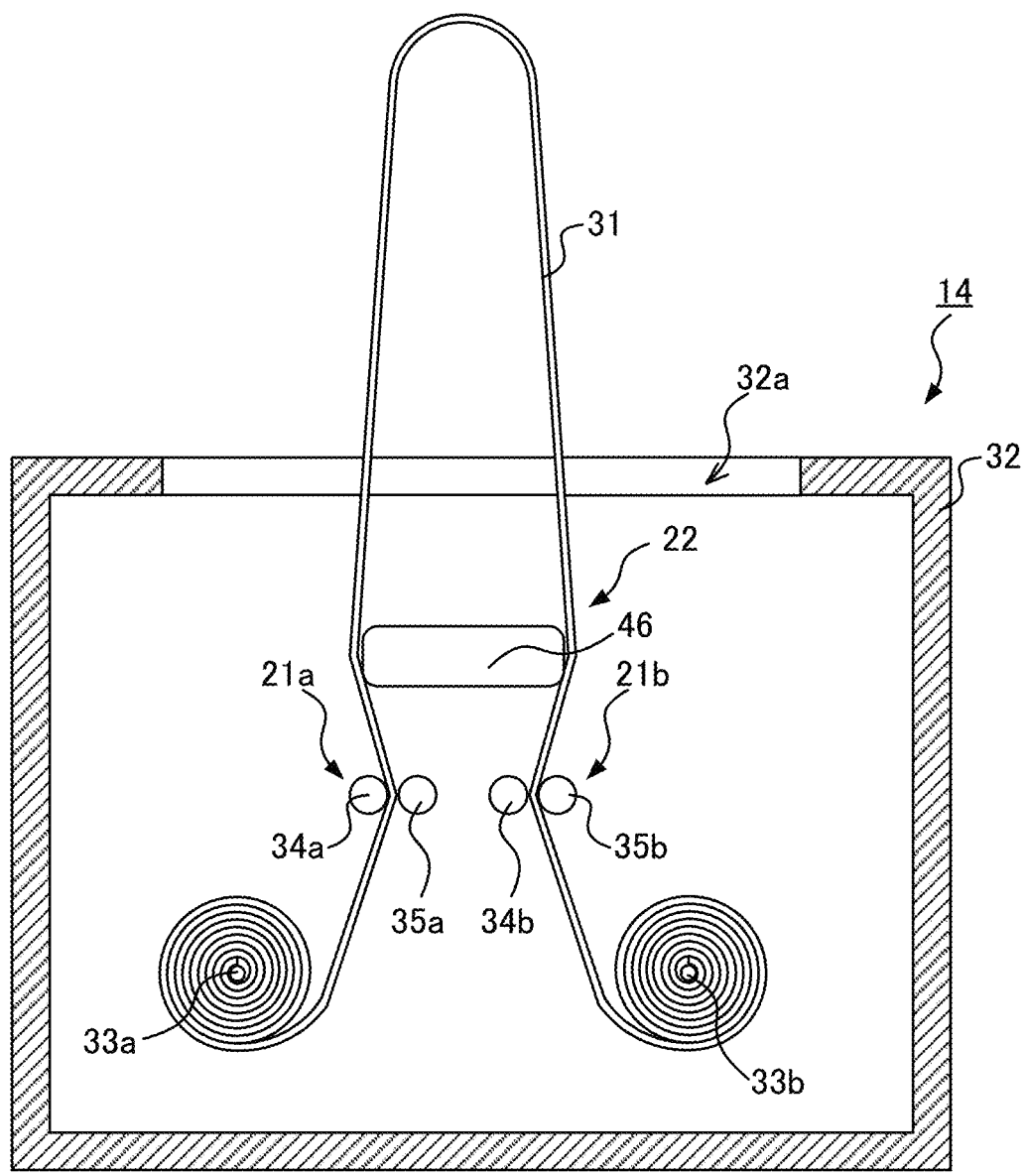
FIG.25
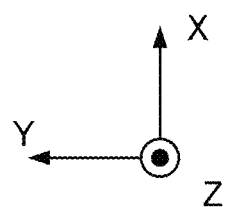

FIG.26
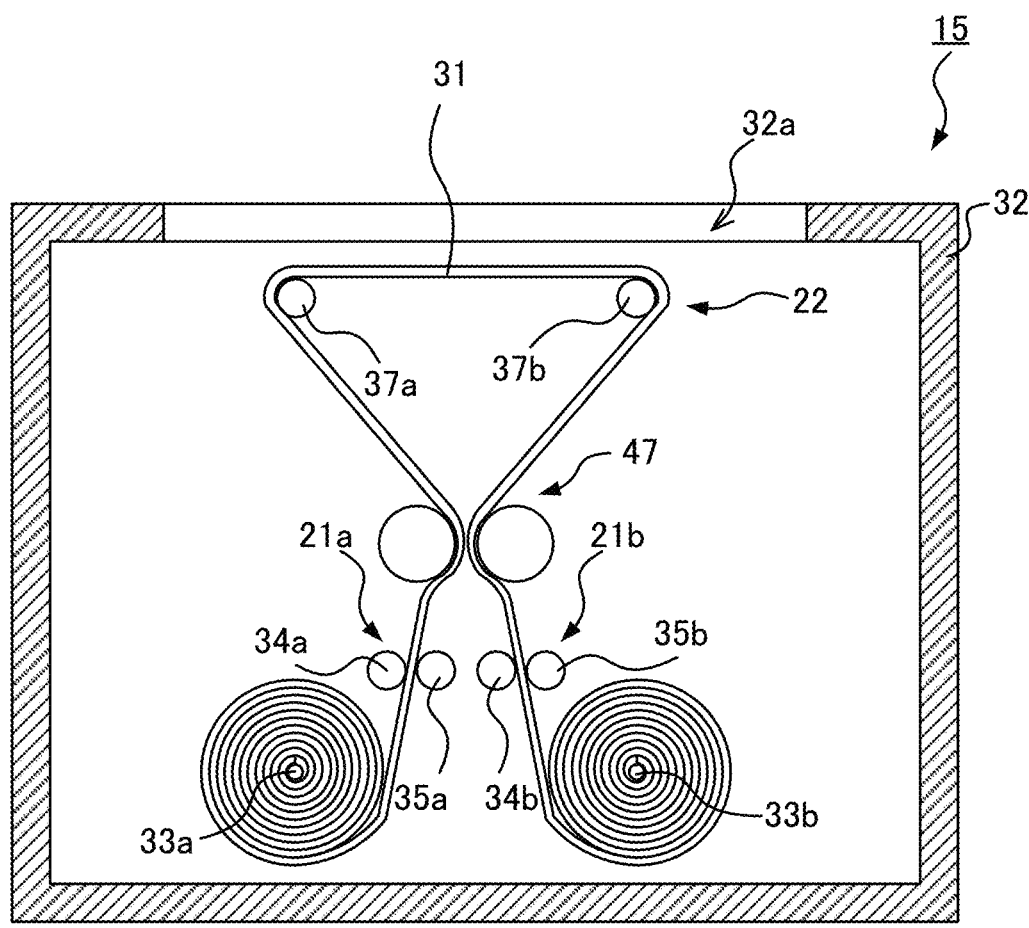
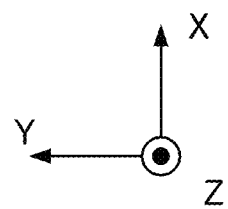

CAPTURING DEVICE AND SPACECRAFT

CROSS-REFERENCE TO RELATED APPLICATION

This application is based on PCT filing PCT/JP2021/025503, filed Jul. 6, 2021, the entire contents of which are incorporated herein by reference.

TECHNICAL FIELD

The present disclosure relates to a capturing device for capturing an artificial space object and a spacecraft including the capturing device.

BACKGROUND ART

Orbits around the earth, such as low earth orbits (LEOs), geostationary transfer orbits (GTOs), and super synchronous orbits (SSOs), contain a large number of artificial space objects. Examples of the artificial space objects include space debris, such as inoperative satellites, components of satellites, and components of rockets uncoupled from the rockets, and spacecrafts.

For the purpose of removal of the space debris existing in the orbits, refueling operations for the spacecrafts in the orbits, and displacement of the spacecrafts to a desired orbit, these artificial space objects need to be captured. The artificial space objects are captured by capturing devices, an example of which is disclosed in Patent Literature 1.

CITATION LIST

Patent Literature

Patent Literature 1: International Publication No. WO 2019/161298

SUMMARY OF INVENTION

Technical Problem

The capturing device disclosed in Patent Literature 1 deforms a tape-shaped spring in accordance with the shape and the size of an artificial space object, twists the deformed spring around the artificial space object, and thus captures the artificial space object. This capturing device requires a mechanism for twisting the deformed spring around the artificial space object and thus inevitably has a complicated structure.

An objective of the present disclosure, which has been accomplished in view of the above situations, is to provide a capturing device and a spacecraft capable of capturing an artificial space object with a simple structure.

Solution to Problem

In order to achieve the above objective, a capturing device according to the present disclosure is to be installed in a spacecraft to capture an artificial space object. The capturing device includes a tethering member having an elongated shape, two retaining members, a housing, one or more driving mechanisms, a deformer, and a driving mechanism controller. The tethering member is stable in a first shape having a curved section orthogonal to a linear extending direction of the tethering member. The two retaining members each retain a corresponding end of ends of the tethering member. The housing has an opening. The housing accommodates at least a part of the tethering member and the two retaining members. The one or more driving mechanisms spread the tethering member to the outside of the housing through the opening, or retract the tethering member to the inside of the housing. The deformer deforms a part of the tethering member in a direction of expanding an area surrounded by the tethering member, while the tethering member is being spread by the one or more driving mechanisms. The driving mechanism controller causes the one or more driving mechanisms to spread the tethering member to the outside of the housing by a target spread length defined by at least the shape and the size of the artificial space object. The driving mechanism controller causes the one or more driving mechanisms, when the artificial space object is located in the area surrounded by the tethering member, to retract the tethering member to the inside of the housing until at least a part of the tethering member comes into contact with the artificial space object.

Advantageous Effects of Invention

The capturing device according to the present disclosure spreads the tethering member having an elongated shape to the outside of the housing. When an artificial space object is located in the area surrounded by the tethering member, the capturing device retracts the tethering member to the inside of the housing until at least a part of the tethering member comes into contact with the artificial space object. This capturing device is designed to capture an artificial space object by spreading and retracting the tethering member, and therefore has a simple structure.

BRIEF DESCRIPTION OF DRAWINGS

FIG. 5 is a sectional view of a tethering member according to Embodiment 1 taken along the line V-V of FIG. 4;

FIG. 6 is a sectional view of the tethering member according to Embodiment 1 taken along the line VI-VI of FIG. 4;

FIG. 16 is a sectional view of a capturing device according to Embodiment 2;

FIG. 21 is a sectional view of a capturing device according to Embodiment 4;

FIG. 24 is a sectional view of a first modification of the capturing device according to the embodiments;

FIG. 25 is another sectional view of the first modification of the capturing device according to the embodiments;

FIG. 26 is a sectional view of a second modification of the capturing device according to the embodiments;

DESCRIPTION OF EMBODIMENTS

Figure 1:
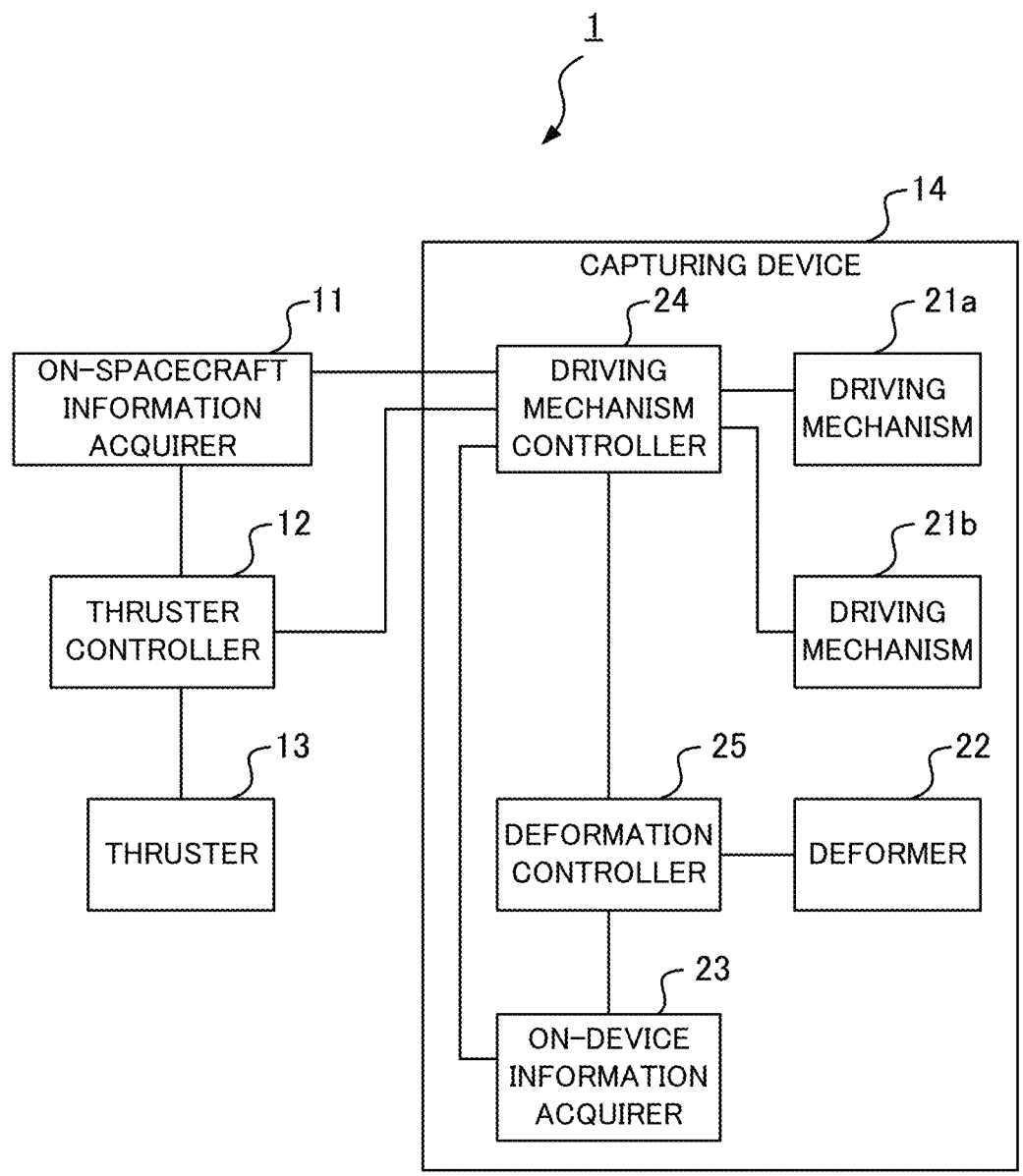
FIG. 1 is a block diagram illustrating a spacecraft according to Embodiment 1.

A capturing device and a spacecraft according to embodiments of the present disclosure are described in detail below with reference to the accompanying drawings. In the drawings, the components identical or corresponding to each other are provided with the same reference symbol.

Embodiment 1

The following describes a capturing device according to Embodiment 1, focusing on an exemplary capturing device installed in a spacecraft to capture an artificial space object, such as space debris, located in a geostationary earth orbit (GEO), which is an example of orbits. A spacecraft 1 illustrated in FIG. 1 includes an on-spacecraft information acquirer 11 to acquire at least information on an artificial space object and the spacecraft 1, a thruster controller 12 to control a thruster 13, the thruster 13 to generate a propulsive force of the spacecraft 1, and a capturing device 14. The capturing device 14 captures an artificial space object 100 with a tethering member 31 spread around the artificial space object 100, as illustrated in FIG. 2.

Figure 2:
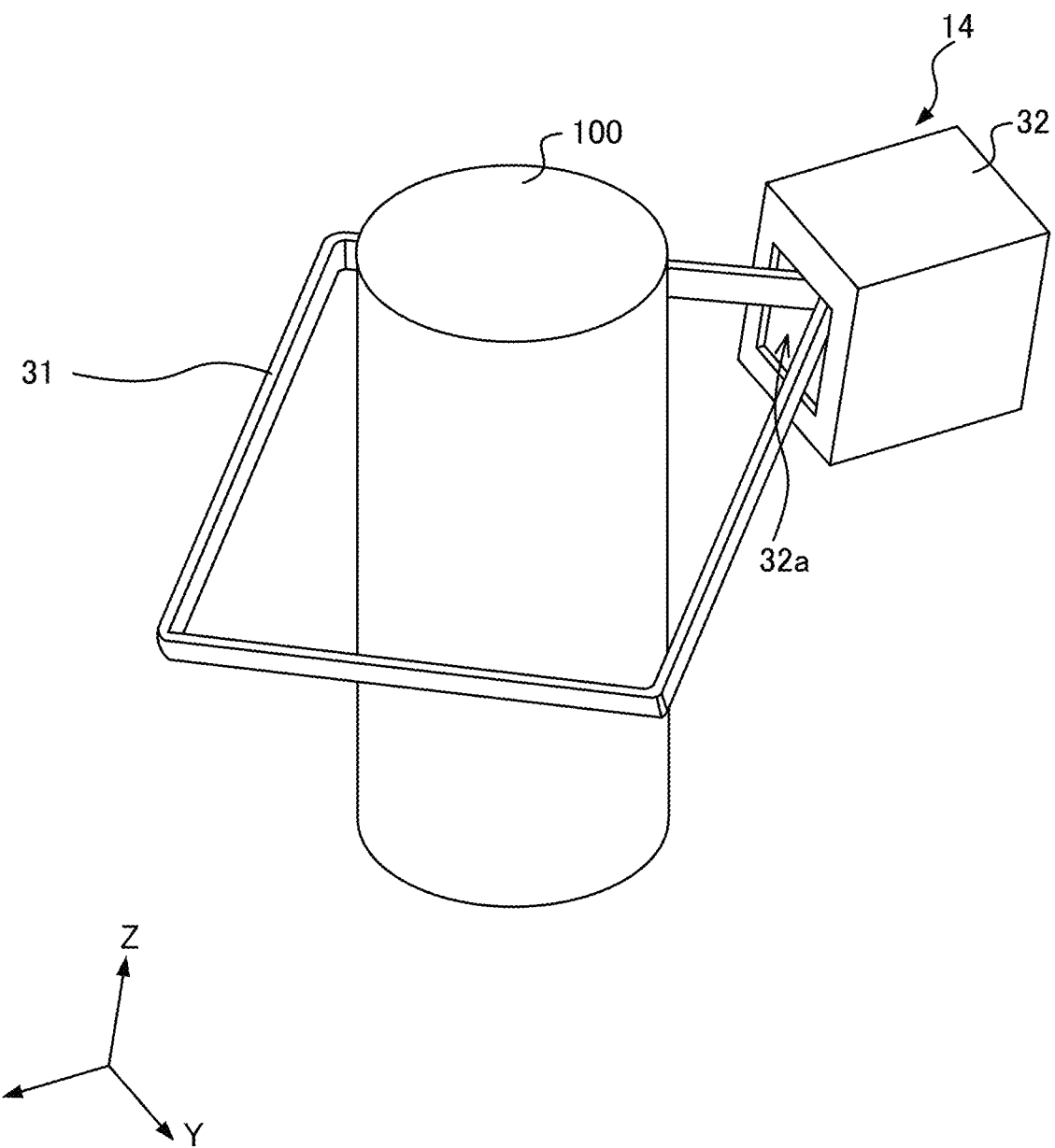
FIG. 2 illustrates an exemplary operation for capturing an artificial space object by a capturing device according to Embodiment 1.

The on-spacecraft information acquirer 11 illustrated in FIG. 1 includes a communication unit that communicates with a ground station, which is a communication facility established on the earth. The on-spacecraft information acquirer 11 acquires, from the ground station, information on the artificial space object 100 and the spacecraft 1, in specific, instantaneous positions of the artificial space object 100 and the spacecraft 1 at predetermined intervals. The on-spacecraft information acquirer 11 then stores the acquired instantaneous positions of the artificial space object 100 and the spacecraft 1 into a storage, which is not illustrated. The on-spacecraft information acquirer 11 preferably includes a component, such as camera or electro-optical distance measuring instrument, and further acquires information on the attitude of the artificial space object 100, and information on the relative attitudes, relative angular rates, and other parameters of the artificial space object 100 and the spacecraft 1, for example.

The description of Embodiment 1 assumes that the ground station is observing the artificial space object 100 and the spacecraft 1 with an optical telescope, for example, and measuring positions of the artificial space object 100 and the spacecraft 1. The on-spacecraft information acquirer 11 obtains velocities of the artificial space object 100 and the spacecraft 1, on the basis of the instantaneous positions of the artificial space object 100 and the spacecraft 1 stored in the above-mentioned storage. For example, the on-spacecraft information acquirer 11 calculates a displacement of the artificial space object 100 per unit time from the instantaneous positions of the artificial space object 100, divides the calculated displacement by the unit time, and thus obtains a velocity of the artificial space object 100. Also, the on-spacecraft information acquirer 11 calculates a displacement of the spacecraft 1 per unit time from the instantaneous positions of the spacecraft 1, divides the calculated displacement by the unit time, and thus obtains a velocity of the spacecraft 1, for example.

On the basis of the positions of the artificial space object 100 and the spacecraft 1 acquired by the on-spacecraft information acquirer 11 and the velocities of the artificial space object 100 and the spacecraft 1 obtained by the on-spacecraft information acquirer 11, the thruster controller 12 determines a direction and a rate of ejection of the thruster 13 for causing the spacecraft 1 to approach the artificial space object 100. The thruster controller 12 then transmits a thruster control signal indicating the direction and the rate of ejection, to the thruster 13.

The thruster controller 12 preferably determines a direction and a rate of ejection of the thruster 13 for causing the spacecraft 1 to approach the artificial space object 100, on the basis of the information on the attitude of the artificial space object 100 acquired by the on-spacecraft information acquirer 11, and the information on the relative attitudes and the relative angular rates of the artificial space object 100 and the spacecraft 1, as well as the positions of the artificial space object 100 and the spacecraft 1 acquired by the on-spacecraft information acquirer 11 and the velocities of the artificial space object 100 and the spacecraft 1 obtained by the on-spacecraft information acquirer 11.

The thruster controller 12 also determines the actual attitude of the spacecraft 1 on the basis of signals acquired from a group of sensors, such as magnetic sensor and gyro sensor, which are mounted in the spacecraft 1 but not illustrated. The thruster controller 12 then determines a target attitude suitable for capturing of the artificial space object 100 with the capturing device 14, on the basis of the actual attitude of the spacecraft 1 and the position of the artificial space object 100. The thruster controller 12 thus determines a direction and a rate of ejection of the thruster 13 for shifting the spacecraft 1 from the actual attitude to the target attitude. The thruster controller 12 then transmits a thruster control signal indicating the direction and the rate of ejection, to the thruster 13.

The thruster 13 includes any number of main thrusters, such as ion thrusters and plasma thrusters. Each of the main thrusters performs ejection in the direction of ejection indicated by the thruster control signal at the rate of ejection indicated by the thruster control signal, thus allowing the spacecraft 1 to approach the artificial space object 100 and to have an attitude approximate to the target attitude.

The capturing device 14 includes driving mechanisms 21a and 21b to spread the tethering member 31 to the outside of the housing 32 or to retract the tethering member 31 to the inside of the housing 32, a deformer 22 to deform parts of the tethering member 31 in directions for expanding the area surrounded by the tethering member 31, and an on-device information acquirer 23 to acquire at least a shape and a size of the artificial space object 100. The capturing device 14 further includes a driving mechanism controller 24 to control the driving mechanisms 21a and 21b, and a deformation controller 25 to control the deformer 22.

Figure 3:
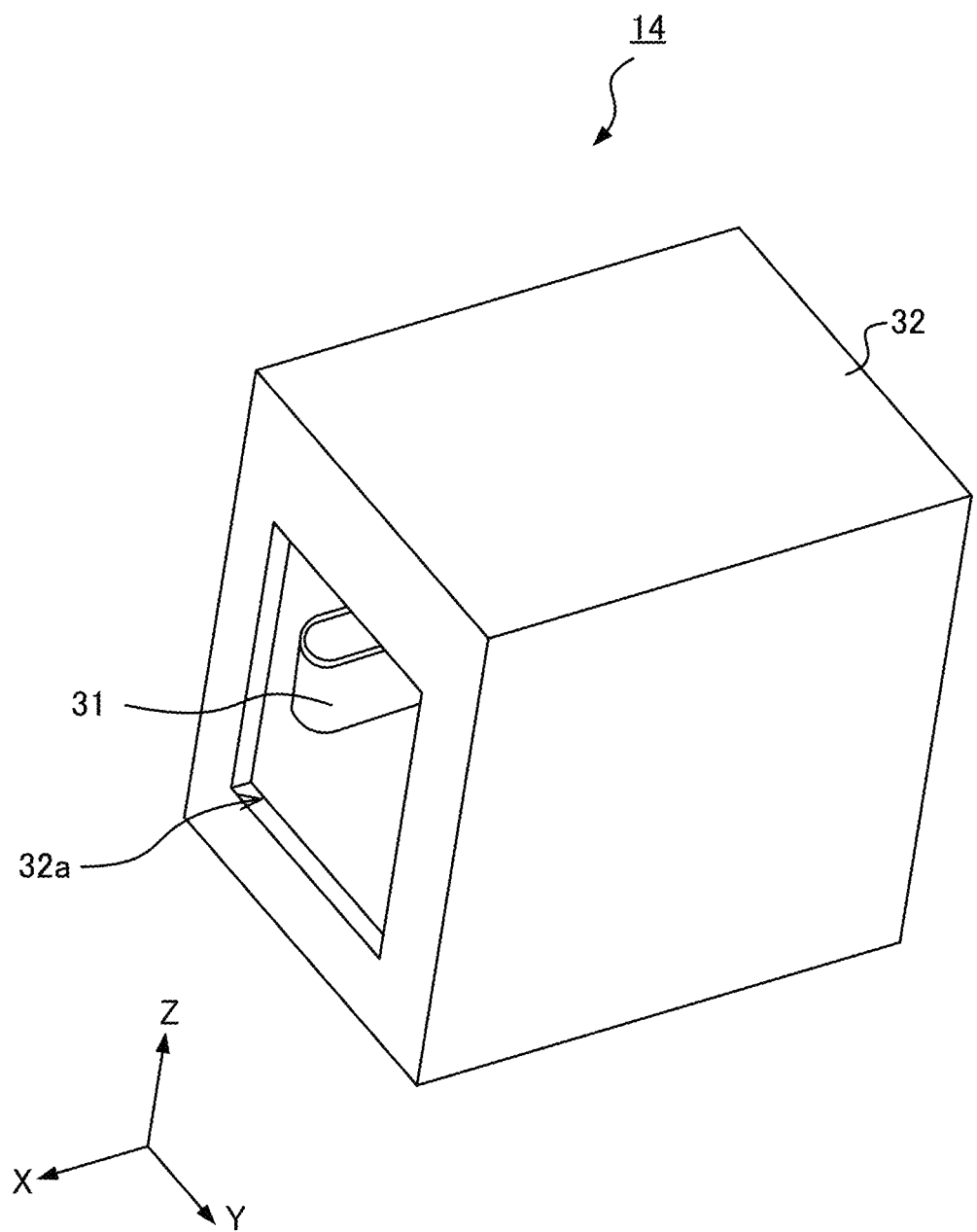
FIG. 3 is a perspective view of the capturing device according to Embodiment 1.
Figure 4:
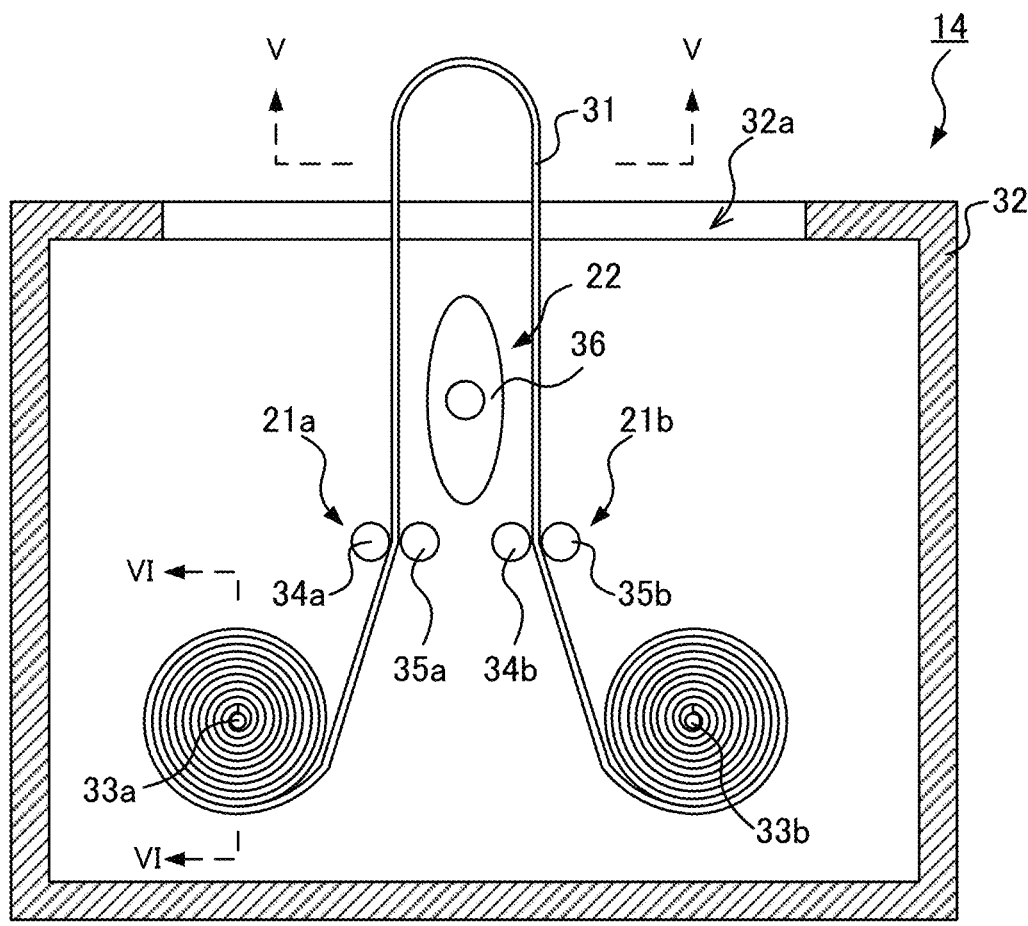
FIG. 4 is a sectional view of the capturing device according to Embodiment 1.

As illustrated in FIGS. 2 to 4, the capturing device 14 also includes the tethering member 31 having an elongated shape, that is, shaped like a tape, two retaining members 33a and 33b to retain ends of the tethering member 31, and a housing 32 to accommodate the components of the capturing device 14 illustrated in FIG. 1, at least a part of the tethering member 31, and the two retaining members 33a and 33b. The definition of the accommodation of the housing 32 includes accommodation of only some of these components inside the housing 32, and accommodation of all the components inside the housing 32. For example, the housing 32 may accommodate the retaining member 33a such that the retaining member 33a is partially exposed to the outside of the housing 32.

The housing 32 has one surface provided with an opening 32a. The Y and Z axes are defined to be contained in a plane parallel to the surface provided with the opening 32a and to be orthogonal to each other. The X axis is defined to be parallel to the direction extending through the opening 32a and to be orthogonal to both of the Y and Z axes. The following assumes the orthogonal coordinate system having the above-mentioned X, Y, and Z axes and fixed to the capturing device 14, and refers to this coordinate system as appropriate. FIG. 4 does not illustrate the on-device information acquirer 23, the driving mechanism controller 24, or the deformation controller 25 among the components of the capturing device 14 illustrated in FIG. 1 for the purpose of simplification, although the components of the capturing device 14 illustrated in FIG. 1 are actually accommodated in the housing 32.

The driving mechanisms 21a and 21b are disposed inside the housing 32. The driving mechanisms 21a and 21b in Embodiment 1 are arranged with a gap therebetween in the Y-axis directions inside the housing 32. The driving mechanisms 21a and 21b in Embodiment 1 are each a pair of pinch rollers controlled by the driving mechanism controller 24. The driving mechanisms 21a and 21b spread the tethering member 31 to the outside of the housing 32 or retract the tethering member 31 to the inside of the housing 32, while holding the tethering member 31 between each of the pairs of pinch rollers. In detail, the driving mechanism 21a includes a pair of rollers 34a and 35a rotatable in the mutually opposite directions at the same rate under the control of the driving mechanism controller 24. The driving mechanism 21b includes a pair of rollers 34b and 35b rotatable in the mutually opposite directions at the same rate under the control of the driving mechanism controller 24.

The deformer 22 buckles parts of the tethering member 31. To buckle the tethering member 31 means to reversibly bend the tethering member 31. In specific, the tethering member 31 buckled by the deformer 22 is retracted by the driving mechanisms 21a and 21b to the inside of the housing 32 while allowing the buckled parts to restore the original shapes. The deformer 22 in Embodiment 1 includes a rotary mechanism 36 disposed at a position more proximal to the opening 32a than the driving mechanisms 21a and 21b are in order to buckle the tethering member 31. The rotary mechanism 36 in Embodiment 1 has an elliptical section orthogonal to the Z-axis directions, of which the major-axis length is larger than the Y-axis distance between the driving mechanisms 21a and 21b.

The rotary mechanism 36 can rotate between the position corresponding to the separate state indicating separation from the tethering member 31 and the position corresponding to the contact state indicating contact with the tethering member 31. The rotary mechanism 36 in the separate state illustrated in FIG. 4 is separate from the tethering member 31 spread by the driving mechanisms 21a and 21b. The rotary mechanism 36 in the contact state is in contact with segments of the tethering member 31 spread by the driving mechanisms 21a and 21b, and thus makes the Y-axis distance between the segments of the tethering member 31 larger than the Y-axis distance between the driving mechanisms 21a and 21b. This operation expands the area surrounded by the tethering member 31.

The on-device information acquirer 23 illustrated in FIG. 1 acquires information on the shape and the size of the artificial space object 100. In detail, the on-device information acquirer 23 identifies the artificial space object 100 to be captured, after the spacecraft 1 sufficiently approaches the artificial space object 100, and then acquires information on the shape and the size of the identified artificial space object 100. For example, the on-device information acquirer 23 includes a camera operable in the cosmic space. The on-device information acquirer 23 generates image data through imaging of the artificial space object 100 with the camera, and then determines a shape and a size of the artificial space object 100 on the basis of the image data. For an artificial space object 100 having a columnar shape like that illustrated in FIG. 2, the on-device information acquirer 23 detects an outer circumference of the artificial space object 100 about the central axis, which is information on the size of the artificial space object 100.

The on-device information acquirer 23 preferably includes a camera or an electro-optical distance measuring instrument, and further acquires information on the relative distance, relative velocities, relative angular rates, relative attitudes, and other parameters of the artificial space object 100 and the spacecraft 1, for example.

The driving mechanism controller 24 acquires the location information on the spacecraft 1 and the artificial space object 100 from the on-spacecraft information acquirer 11, and acquires the information on the shape and the size of the artificial space object 100 from the on-device information acquirer 23. The driving mechanism controller 24 determines a target spread length, which indicates a target value of the length of the tethering member 31 to be spread to the outside of the housing 32, on the basis of the location information on the spacecraft 1 and the artificial space object 100, and the shape and the size of the artificial space object 100. A typical example of the target spread length used by the driving mechanism controller 24 is 1.5 times as long as the outer circumference of the artificial space object 100 about the central axis detected by the on-device information acquirer 23.

In the case where the on-device information acquirer 23 acquires the information on the relative distance, relative velocities, relative angular rates, relative attitudes, and other parameters of the artificial space object 100 and the spacecraft 1, in addition to the shape and the size of the artificial space object 100, the driving mechanism controller 24 preferably determines a target spread length on the basis of the location information on the spacecraft 1 and the artificial space object 100, the shape and the size of the artificial space object 100, and the information on the relative distance, relative velocities, relative angular rates, relative attitudes, and other parameters of the artificial space object 100 and the spacecraft 1.

The driving mechanism controller 24 causes the driving mechanisms 21a and 21b to spread the tethering member 31 to the outside of the housing 32, until the length of the tethering member 31 that has been spread to the outside of the housing 32 reaches the target spread length. In detail, the driving mechanism controller 24 detects the length of the tethering member 31 that has been spread to the outside of the housing 32 from values measured at encoders, which are not illustrated, for measuring rotational angles of the rollers 34a, 35a, 34b, and 35b. The driving mechanism controller 24 then causes the driving mechanisms 21a and 21b to spread the tethering member 31 to the outside of the housing 32, until the detected length of the tethering member 31 reaches the target spread length.

The deformation controller 25 acquires the information on the shape and the size of the artificial space object 100 from the on-device information acquirer 23, and acquires the information on the length of the tethering member 31 that has been spread to the outside of the housing 32 from the driving mechanism controller 24. When the length of the tethering member 31 that has been spread to the outside of the housing 32 reaches a first spread length defined by the shape and the size of the artificial space object 100, the deformation controller 25 causes the rotary mechanism 36 of the deformer 22 to rotate from the position corresponding to the separate state to the position corresponding to the contact state, and thus deforms the tethering member 31. The first spread length is shorter than the target spread length, and equal to a value calculated by multiplying the target spread length by a value of 0.5, for example.

The tethering member 31 is made of an elongated metal member, in specific, a tape-shaped metal spring having ends fixed to the retaining members 33a and 33b. The tethering member 31 in Embodiment 1 is made of a convex spring, for example. The elongated metal member of the tethering member 31 has a length of 10 m, for example, which is sufficiently long to surround an artificial space object 100 having an outer circumference of equal to or longer than 1 m and shorter than 10 m, for example. The tethering member 31 in Embodiment 1 is accommodated inside the housing 32 while having a U-shaped bent, and is spread by the driving mechanisms 21a and 21b to the outside of the housing 32 such that the U-shaped bent comes out first to the outside.

The tethering member 31 is stable in a first shape having a curved section orthogonal to the linear extending direction of the tethering member 31.

In detail, the tethering member 31 is caused by the driving mechanisms 21a and 21b to be unwound from the retaining members 33a and 33b and to be stretched out to define straight contours, and thus is brought into the stable first shape. As illustrated in FIG. 5, which is a sectional view taken along the line V-V of FIG. 4, the X-axially extending segments of the tethering member 31 spread to the outside of the housing 32 are stable in the first shape having a curved section orthogonal to the extending direction. These segments of the tethering member 31 have curved main surfaces 31a. The two segments of the tethering member 31 extending in the X-axis direction and having the stable first shape are intervened by the segment of the tethering member 31 extending in an arc shape.

The tethering member 31 is preferably stable in a second shape having a rectangular section orthogonal to the extending direction while being wound around the retaining members 33a and 33b. The main surfaces 31a of the tethering member 31 wound around the retaining members 33a and 33b receive radially inward forces from radially outer segments of the tethering member 31. In specific, a part of the tethering member 31, while being wound around the retaining member 33a and receiving a force in the direction of flattening the main surfaces 31a, is preferably stable in the second shape having a rectangular section orthogonal to the extending direction, as illustrated in FIG. 6, which is a sectional view taken along the line VI-VI of FIG. 4. Also, another part of the tethering member 31 while being wound around the retaining member 33b, is preferably stable in the second shape, although this configuration is not illustrated.

The tethering member 31 is partially wound around the retaining members 33a and 33b, which are fixed to the ends of the tethering member 31. The retaining members 33a and 33b retain the ends of the tethering member 31 with sufficiently high strengths to prevent the tethering member 31 from being detached during spreading or retraction of the tethering member 31, for example. The retaining members 33a and 33b are provided to the housing 32 such that the retaining members 33a and 33b are rotatable in accordance with the operations of the driving mechanisms 21a and 21b.

Figure 7:
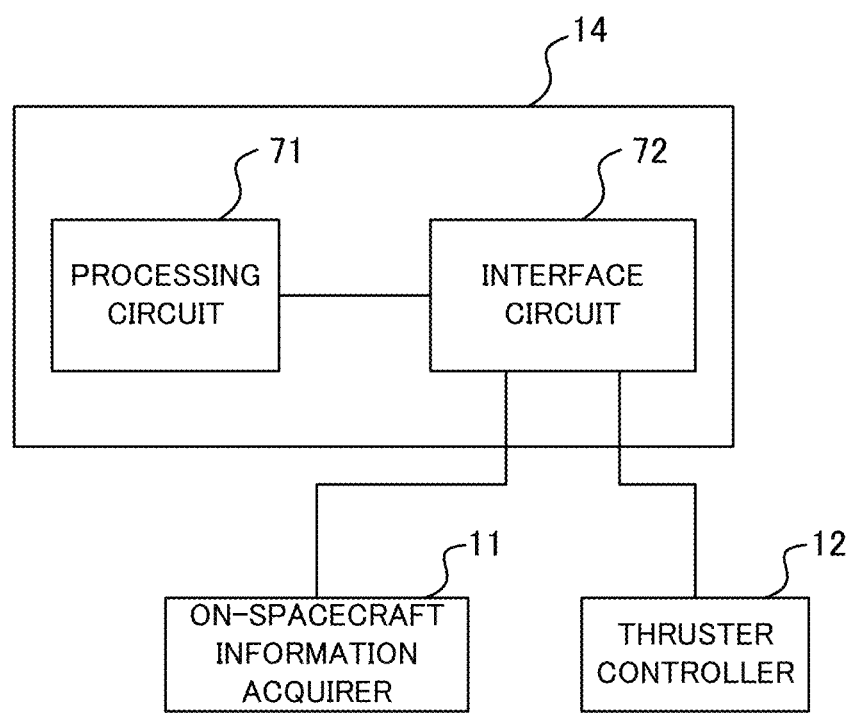
FIG. 7 illustrates a hardware configuration of the capturing device according to Embodiment 1.

As illustrated in FIG. 7, the hardware configuration for controlling the components of the capturing device 14 is achieved by a processing circuit 71. The processing circuit 71 is connected via an interface circuit 72 to the on-spacecraft information acquirer 11 and the thruster controller 12. In the case where the processing circuit 71 is dedicated hardware, the processing circuit 71 is a single circuit, a combined circuit, a processor, an application specific integrated circuit (ASIC), a field programmable gate array (FPGA), or a combination thereof, for example. The control circuits of the capturing device 14, in specific, the on-device information acquirer 23, the driving mechanism controller 24, and the deformation controller 25 may be achieved by separate processing circuits 71. Alternatively, the on-device information acquirer 23, the driving mechanism controller 24, and the deformation controller 25 may be achieved by a common processing circuit 71.

The following describes an operation of the capturing device 14 having the above-described configuration for capturing the artificial space object 100. The on-spacecraft information acquirer 11 illustrated in FIG. 1, when acquiring the location information on the artificial space object 100 to be captured and the location information on the spacecraft 1 from the ground station, obtains velocities of the artificial space object 100 and the spacecraft 1. The on-spacecraft information acquirer 11 then transmits the instantaneous positions of the artificial space object 100 and the spacecraft 1 and the velocities of the artificial space object 100 and the spacecraft 1, to the thruster controller 12.

On the basis of the positions and the velocities of the artificial space object 100 and the spacecraft 1, the thruster controller 12 determines a direction and a rate of ejection of the thruster 13 for causing the spacecraft 1 to approach the artificial space object 100. The thruster controller 12 then transmits a thruster control signal indicating the direction and the rate of ejection, to the thruster 13. The thruster 13 performs ejection in accordance with the thruster control signal, and thus causes the spacecraft 1 to approach the artificial space object 100.

The thruster controller 12 also calculates an actual attitude of the spacecraft 1 and an actual attitude of the artificial space object 100. The thruster controller 12 then determines a direction and a rate of ejection of the thruster 13 for directing the opening 32a of the housing 32 of the capturing device 14 included in the spacecraft 1 toward the artificial space object 100. The thruster controller 12 then transmits a thruster control signal indicating the direction and the rate of ejection, to the thruster 13. The thruster 13 performs ejection in accordance with the thruster control signal, and thus directs the opening 32a of the housing 32 of the capturing device 14 toward the artificial space object 100.

The driving mechanism controller 24 acquires the positions of the artificial space object 100 and the spacecraft 1 from the on-spacecraft information acquirer 11. When the acquired positions indicate the spacecraft 1 having arrived at an area of possible capturing of the artificial space object 100, the driving mechanism controller 24 causes the driving mechanisms 21a and 21b to start spreading the tethering member 31. When the on-spacecraft information acquirer 11 acquires the information on the relative attitudes, relative accelerations, and other parameters of the artificial space object 100 and the spacecraft 1, the driving mechanism controller 24 preferably causes the driving mechanisms 21a and 21b to start spreading the tethering member 31 on condition that the spacecraft 1 is located within the area of possible capturing of the artificial space object 100 and has a relative attitude and a relative acceleration to the artificial space object 100 that satisfy the conditions of possible capturing.

In detail, the driving mechanism controller 24 rotates the roller 34a of the driving mechanism 21a in the counterclockwise direction about the rotational axis parallel to the Z axis, and rotates the roller 35a of the driving mechanism 21a in the clockwise direction about the rotational axis parallel to the Z axis. The driving mechanism controller 24 also rotates the roller 34b of the driving mechanism 21b in the counterclockwise direction about the rotational axis parallel to the Z axis, and rotates the roller 35b of the driving mechanism 21b in the clockwise direction about the rotational axis parallel to the Z axis.

This process causes the tethering member 31 accommodated inside the housing 32 to be spread to the outside of the housing 32 such that the U-shaped bent comes out first to the outside, as illustrated in FIGS. 3 and 4. Further rotations of the rollers 34a, 35a, 34b, and 35b caused by the driving mechanism controller 24 as described above further spread the tethering member 31 to the outside of the housing 32, as illustrated in FIGS. 8 and 9.

Figure 8:
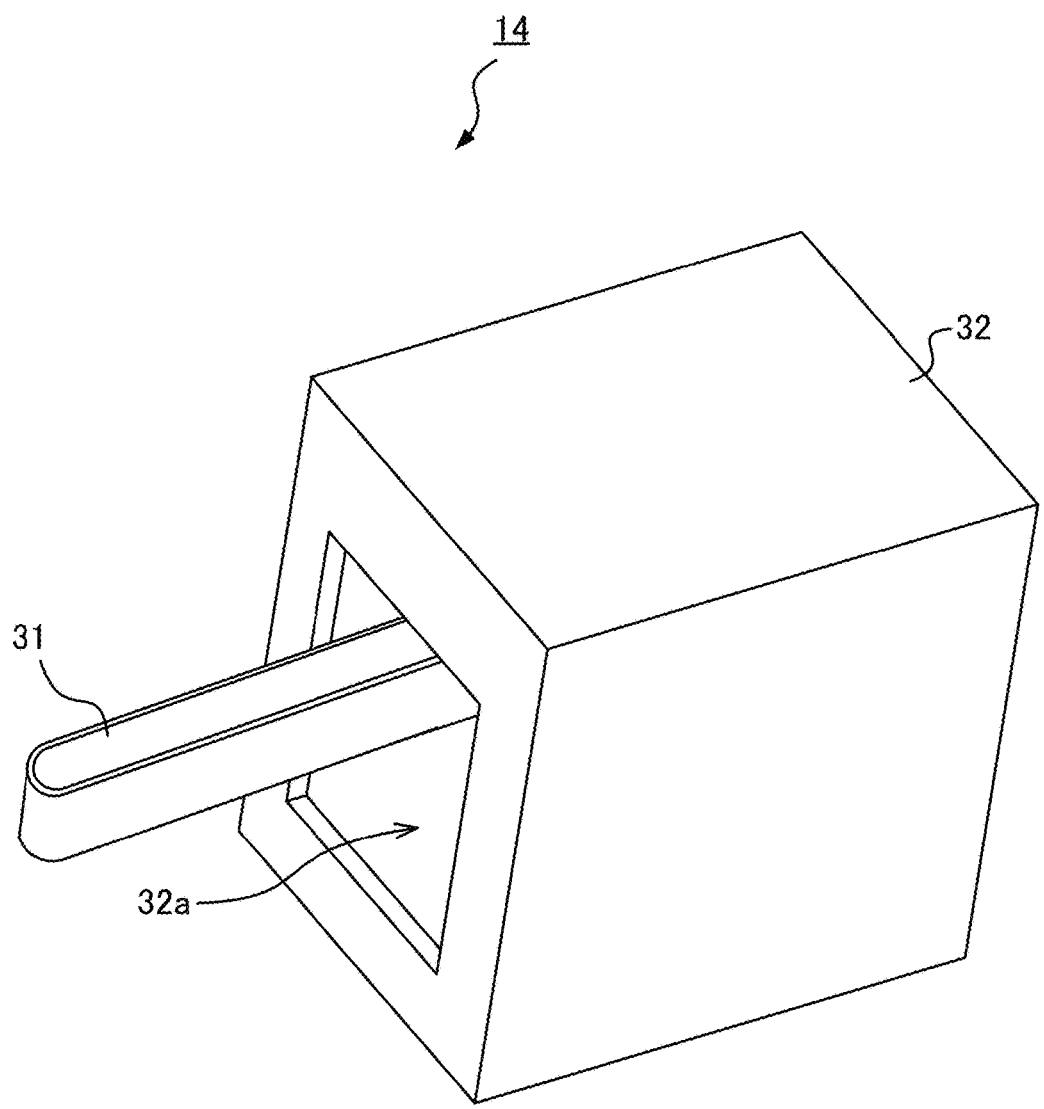
FIG. 8 is another perspective view of the capturing device according to Embodiment 1.
Figure 9:
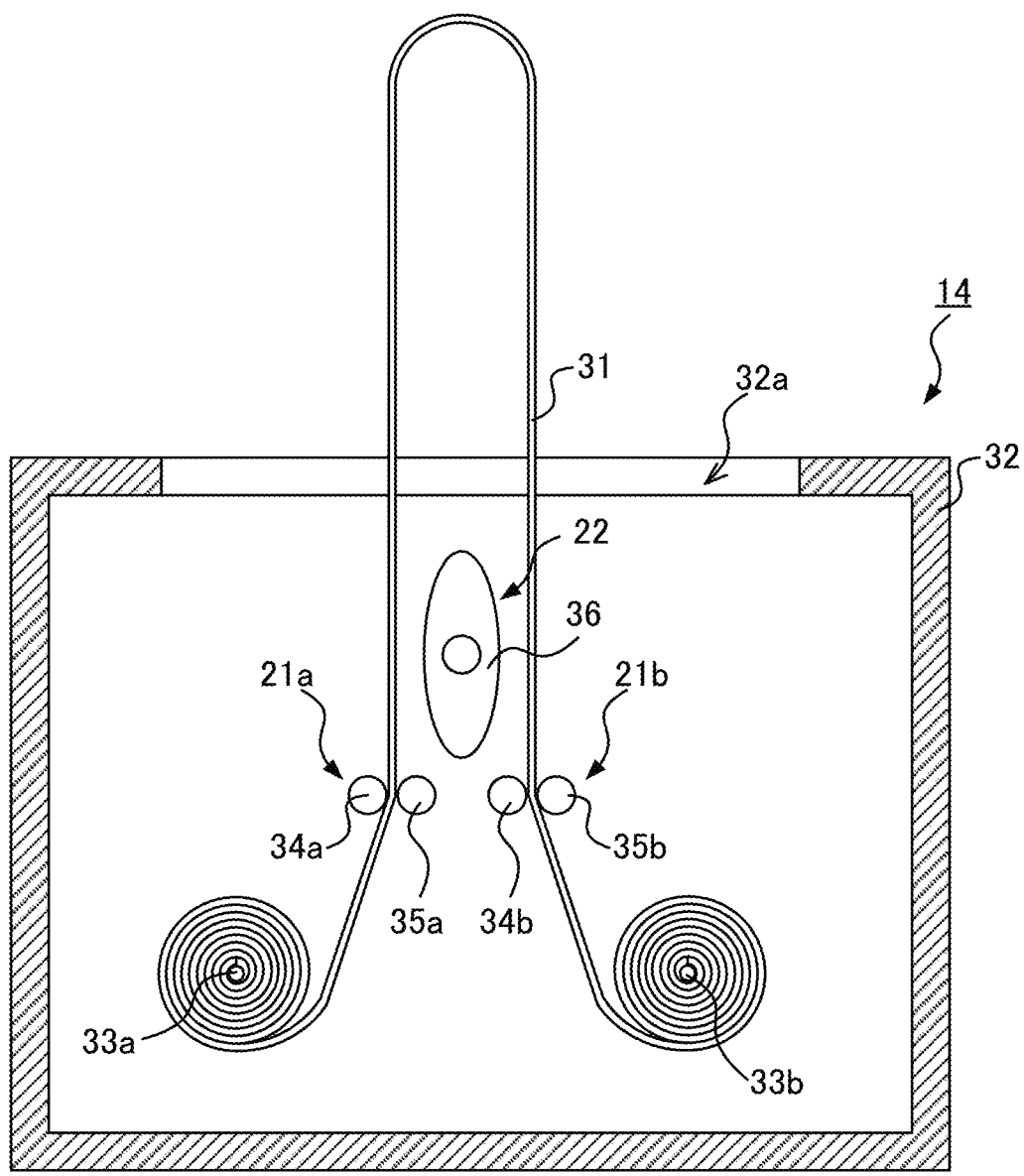
FIG. 9 is another sectional view of the capturing device according to Embodiment 1.

FIGS. 8 and 9 assume a state in which the length of the tethering member 31 that has been spread to the outside of the housing 32 reaches the first spread length defined by the shape and the size of the artificial space object 100. When the length of the tethering member 31 that has been spread to the outside of the housing 32 reaches the first spread length, the deformation controller 25 causes the rotary mechanism 36 of the deformer 22 to rotate from the position corresponding to the separate state to the position corresponding to the contact state. In the position corresponding to the contact state, one end of the rotary mechanism 36 is more proximal to the positive side in the Y-axis directions than the driving mechanism 21a is, whereas the other end of the rotary mechanism 36 is more proximal to the negative side in the Y-axis directions than the driving mechanism 21b is. In specific, the one end of the rotary mechanism 36 is more proximal to the positive side in the Y-axis directions than the gap between the rollers 34a and 35a, whereas the other end of the rotary mechanism 36 is more proximal to the negative side in the Y-axis directions than the gap between the rollers 34b and 35b is.

Figure 10:
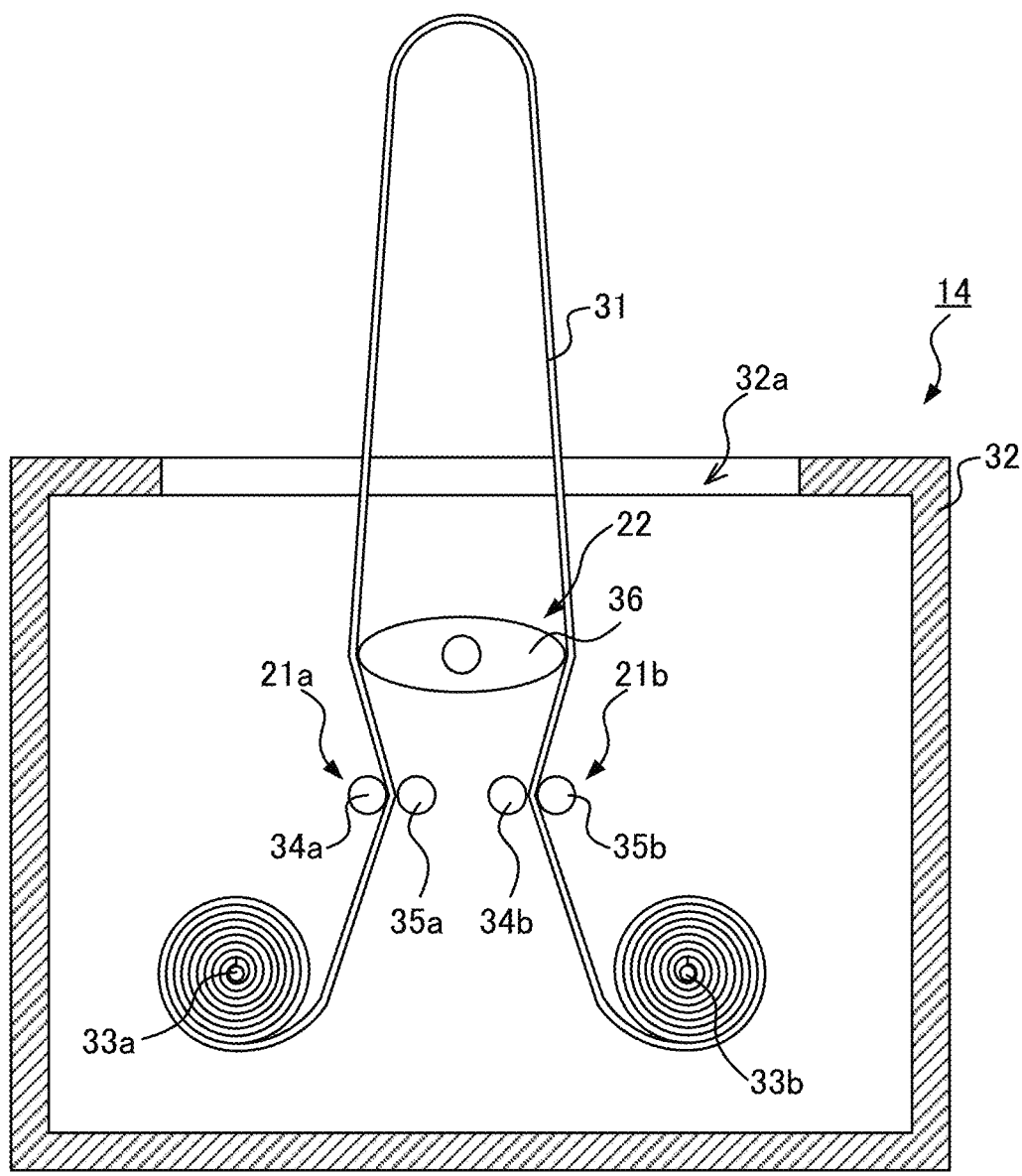
FIG. 10 is another sectional view of the capturing device according to Embodiment 1.

The rotary mechanism 36 thus comes into contact with the tethering member 31 and buckles the tethering member 31, as illustrated in FIG. 10. In detail, the rotary mechanism 36 makes the Y-axis distance between the segments of the tethering member 31 larger than the Y-axis distance between the driving mechanisms 21a and 21b. In other words, the deformer 22 deforms the tethering member 31 in directions for expanding the area surrounded by the tethering member 31. The rotary mechanism 36 has a major-axis length defined depending on a target value of the inner angle of the buckled segments of the tethering member 31. For example, the rotary mechanism 36 is designed to have a larger major-axis length, which can achieve a smaller inner angle of the buckled segments of the tethering member 31.

Figure 11:
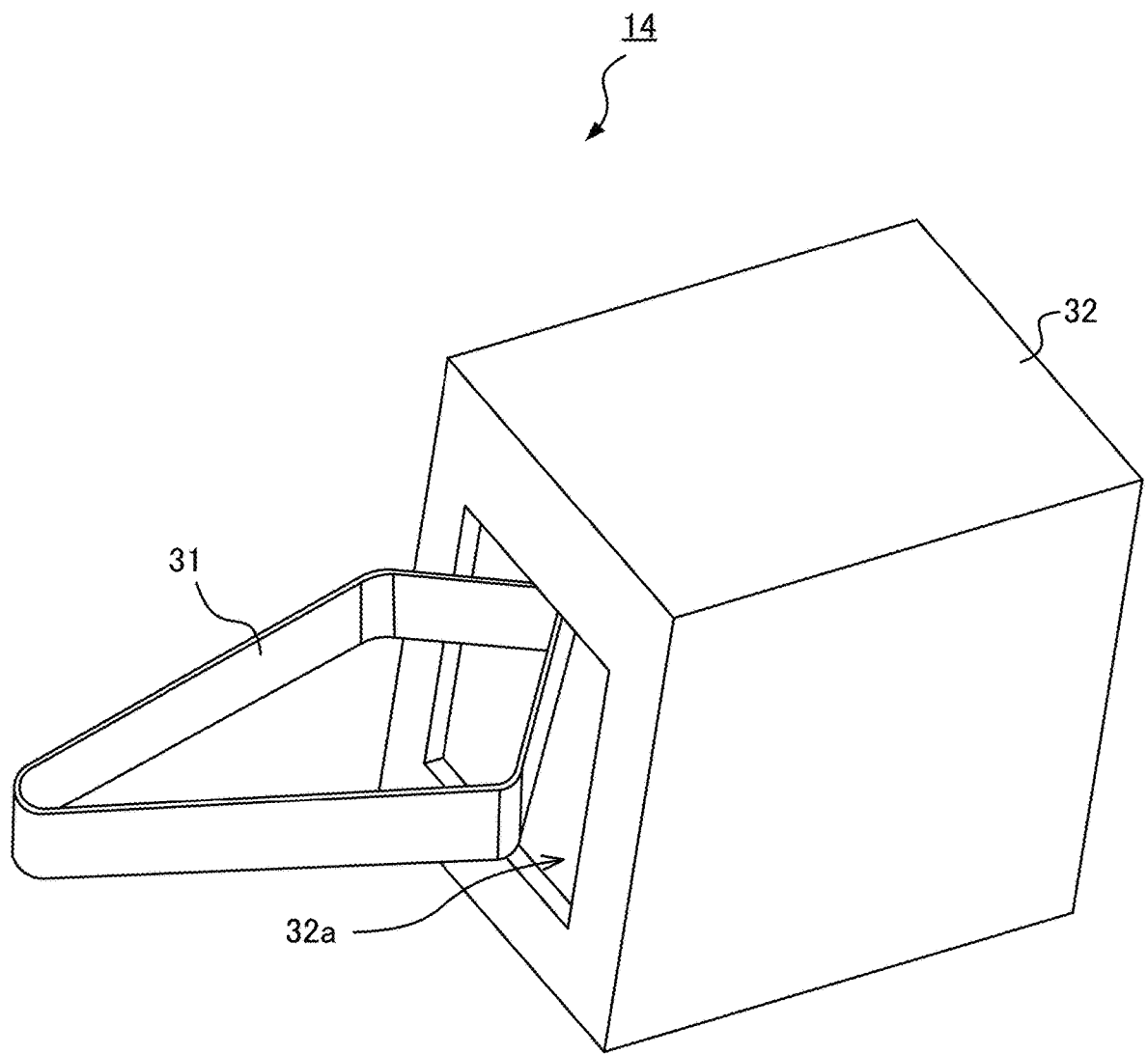
FIG. 11 is another perspective view of the capturing device according to Embodiment 1.
Figure 12:
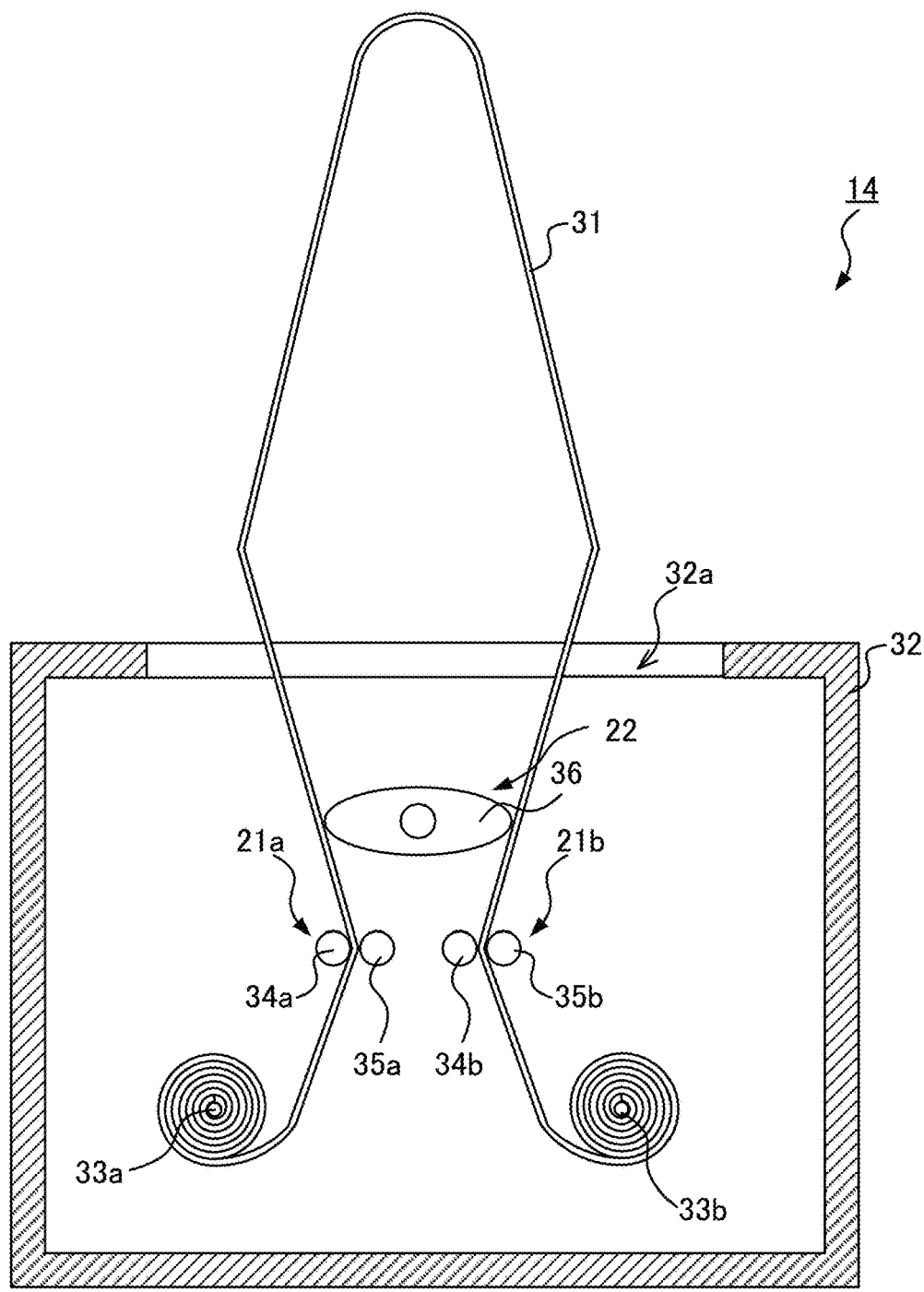
FIG. 12 is another sectional view of the capturing device according to Embodiment 1.

The driving mechanism controller 24 then causes the driving mechanisms 21a and 21b to further spread the tethering member 31. The tethering member 31 is accordingly spread to the outside of the housing 32 while being pushed outward in the Y-axis directions by the rotary mechanism 36 of the deformer 22. The area surrounded by the tethering member 31 is thus expanded in the Y-axis directions, as illustrated in FIGS. 11 and 12. The linear segments of the tethering member 31 are stable in the first shape having a curved section, thus maintaining the contours of the tethering member 31 expanded by the rotary mechanism 36 of the deformer 22.

The driving mechanism controller 24, when the length of the tethering member 31 that has been spread to the outside of the housing 32 reaches the target spread length, stops spreading the tethering member 31. For example, the driving mechanism controller 24 stops spreading the tethering member 31 in the state illustrated in FIG. 13.

Figure 13:
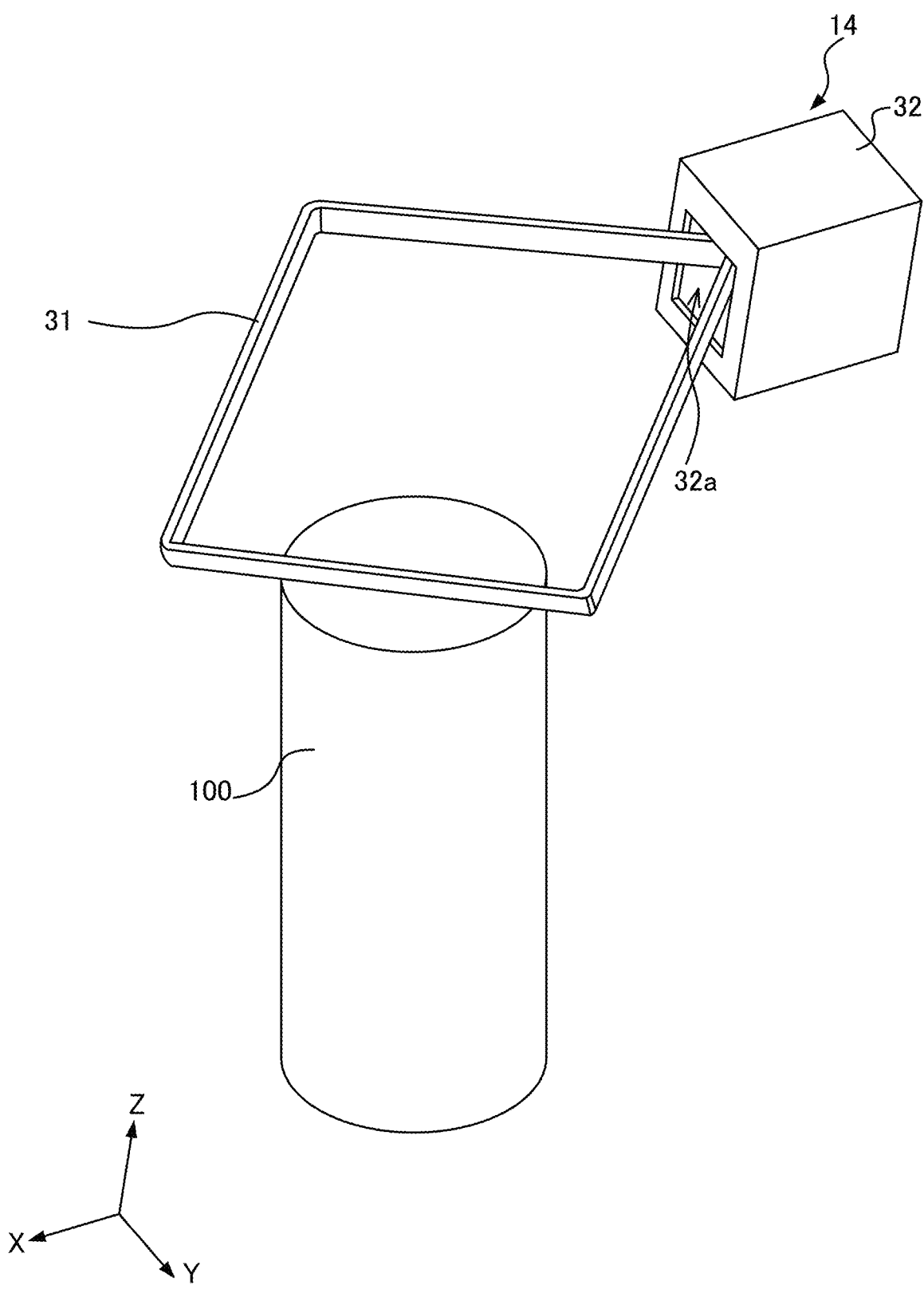
FIG. 13 illustrates an exemplary operation for capturing the artificial space object by the capturing device according to Embodiment 1.

In the state illustrated in FIG. 13, the artificial space object 100 is not located in the area surrounded by the tethering member 31, despite of the length of the spread tethering member 31 reaching the target spread length. After the driving mechanism controller 24 stops spreading the tethering member 31, the thruster controller 12 determines a direction and a rate of ejection of the thruster 13 for surrounding the artificial space object 100 with the spread tethering member 31. The thruster controller 12 then transmits a thruster control signal indicating the direction and the rate of ejection, to the thruster 13. The thruster 13 performs ejection and displaces the spacecraft 1 and accordingly displaces the capturing device 14 such that the artificial space object 100 is located in the area surrounded by the tethering member 31, as illustrated in FIG. 2.

Figure 14:
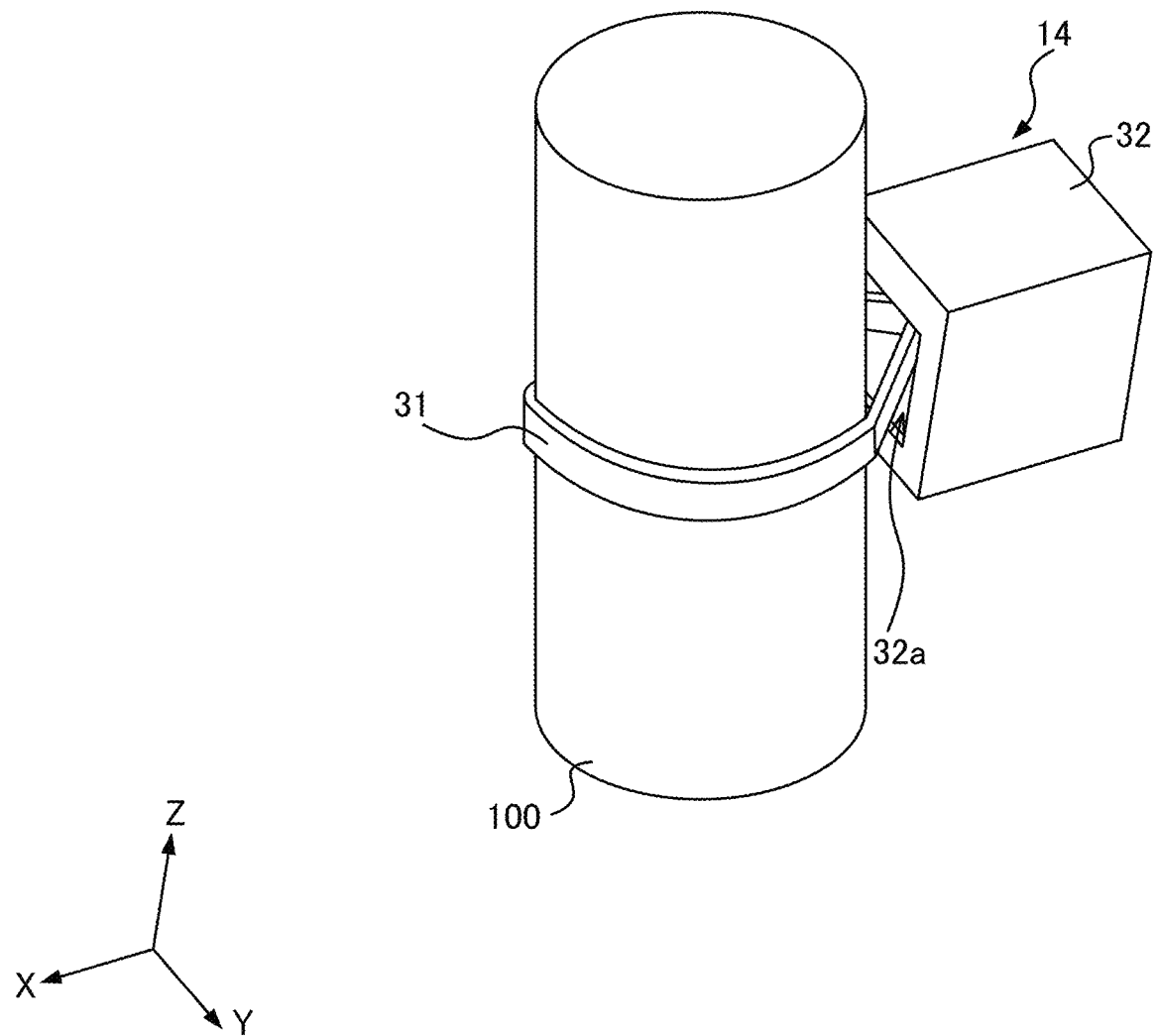
FIG. 14 illustrates an exemplary operation for capturing the artificial space object by the capturing device according to Embodiment 1.

The on-device information acquirer 23 acquires information on the positional relationship between the artificial space object and the tethering member, for example. In specific, the on-device information acquirer 23 takes an image containing the tethering member 31, for example. On the basis of the image taken by the on-device information acquirer 23, the driving mechanism controller 24 determines whether the artificial space object 100 is located in the area surrounded by the tethering member 31. When determining that the artificial space object 100 is located in the area surrounded by the tethering member 31, the driving mechanism controller 24 causes the driving mechanisms 21a and 21b to start winding the tethering member 31. In detail, the driving mechanism controller 24 causes the driving mechanisms 21a and 21b to retract the tethering member 31 to the inside of the housing 32 until at least a part of the tethering member 31 comes into contact with the artificial space object 100. This operation allows the tethering member 31 and the housing 32 to surround the artificial space object 100, as illustrated in FIG. 14, and enables the capturing device 14 to capture the artificial space object 100.

The driving mechanism controller 24 in Embodiment 1 controls and rotates the pair of rollers 34a and 35a of the driving mechanism 21a and the pair of rollers 34b and 35b of the driving mechanism 21b, so as to maintain the length of the tethering member 31 to be wound per unit time at a certain target length. Despite of this control of the driving mechanism controller 24 over the rollers 34a, 35a, 34b, and 35b, the length of the tethering member 31 wound per unit time fails to reach the target length after the artificial space object 100 comes into contact with the tethering member 31 and the housing 32. In other words, the artificial space object 100 is deemed to have been successfully captured, when the length of the tethering member 31 to be wound per unit time is shorter than the target length during the control over the rollers 34a, 35a, 34b, and 35b for maintaining the length of the tethering member 31 wound per unit time at the target length. The driving mechanism controller 24 thus stops the driving mechanisms 21a and 21b in response to a decrease in the length of the tethering member 31 wound per unit time during this control over the rollers 34a, 35a, 34b, and 35b.

At the start of retraction of the tethering member 31, the deformation controller 25 preferably rotates the rotary mechanism 36 of the deformer 22 from the position corresponding to the contact state to the position corresponding to the separate state. The rotary mechanism 36 in the position corresponding to the separate state is separate from the tethering member 31. The rotary mechanism 36 is thus in no contact with the tethering member 31 and allows for smooth retraction of the tethering member 31 to the inside of the housing 32.

After completion of capturing of the artificial space object 100 by the capturing device 14, the thruster controller 12 determines a direction and a rate of ejection of the thruster 13 for departing from the original orbit of the artificial space object 100. The thruster controller 12 transmits a thruster control signal indicating the direction and the rate of ejection, to the thruster 13. The thruster 13 then performs ejection in accordance with the thruster control signal, and displaces the spacecraft 1 accompanied with the artificial space object 100 captured by the capturing device 14. The artificial space object 100 can thus be displaced to a target orbit. Examples of the target orbit include graveyard orbits and orbits from which an object can enter the earth's atmosphere.

The driving mechanism controller 24 then spreads the tethering member 31 to the outside of the housing 32 by a sufficiently long length to allow the artificial space object 100 to leave the capturing device 14. The driving mechanism controller 24 stops spreading the tethering member 31, and the thruster controller 12 then determines a direction and a rate of ejection of the thruster 13 for departing from the target orbit to which the artificial space object 100 is displaced. The thruster controller 12 transmits a thruster control signal indicating the direction and the rate of ejection, to the thruster 13. The thruster 13 then performs ejection in accordance with the thruster control signal, and thus causes the spacecraft 1 to leave the target orbit to which the artificial space object 100 is displaced. The artificial space object 100 at this stage is not captured by the capturing device 14, since the tethering member 31 has been spread by a sufficiently long length to allow the artificial space object 100 to leave the capturing device 14 as described above. The artificial space object 100 thus remains in the target orbit, without accompanying the spacecraft 1.

As described above, the capturing device 14 according to Embodiment 1 spreads the tethering member 31 to the outside of the housing 32. The capturing device 14, when the artificial space object 100 is located in the area surrounded by the tethering member 31, retracts the tethering member 31 to the inside of the housing 32 until at least a part of the tethering member 31 comes into contact with the artificial space object 100. The capturing device 14 is designed to capture the artificial space object 100 by spreading and retracting the tethering member 31, and therefore has a simple structure.

The tethering member 31 wound around the retaining members 33a and 33b is stable in the second shape having a rectangular section orthogonal to the extending direction. This tethering member 31 requires a smaller accommodation space inside the housing 32.

Embodiment 2

Figure 15:
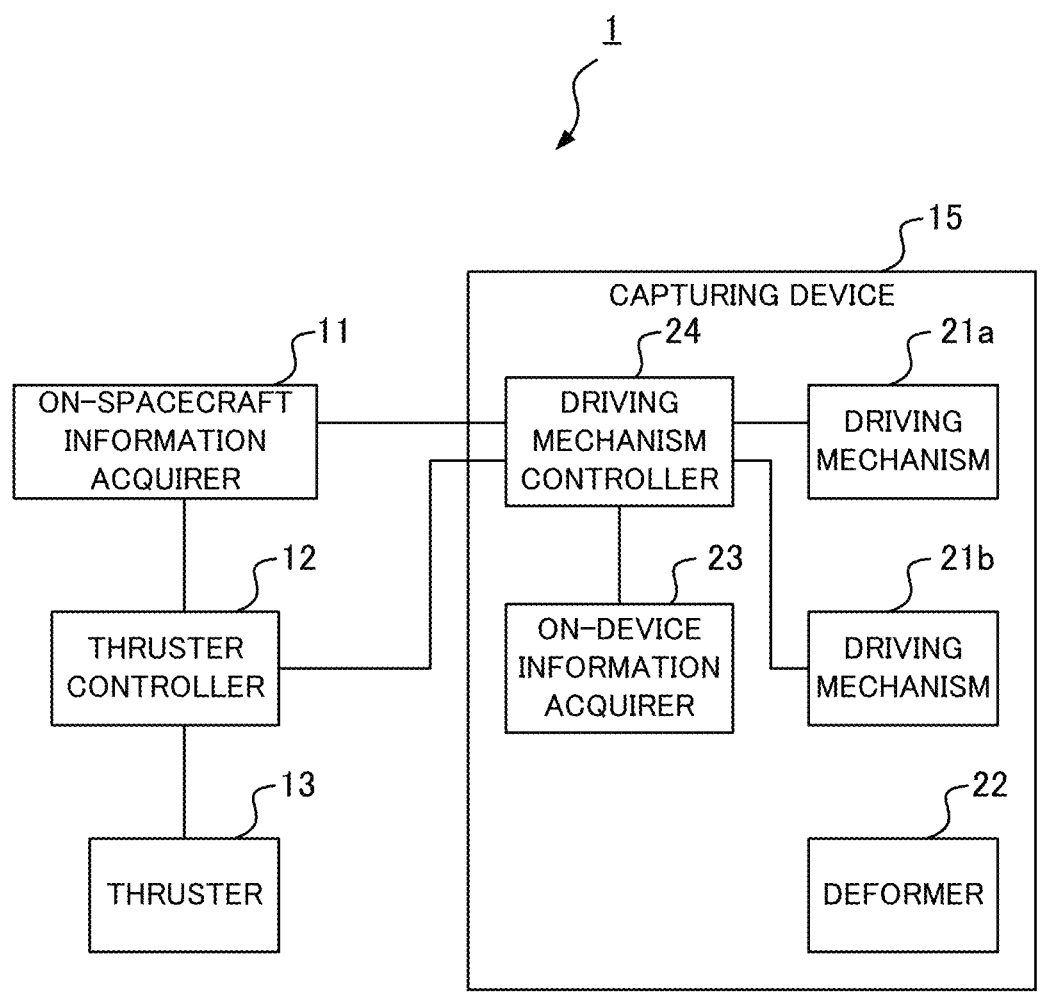
FIG. 15 is a block diagram illustrating a spacecraft according to Embodiment 2.

The configuration of the deformer 22 in Embodiment 1 is a mere example and may be replaced with any configuration capable of expanding the tethering member 31 to a sufficiently large size to surround the artificial space object 100. The description of Embodiment 2 is directed to a capturing device 15 including the deformer 22 having a configuration different from that in Embodiment 1. As illustrated in FIG. 15, the spacecraft 1 including the capturing device 15 has the configurations and operations similar to those of the spacecraft 1 according to Embodiment 1. The capturing device 15 differs from the capturing device 14 of the spacecraft 1 according to Embodiment 1 in the configuration of the capturing device 15 lacking the deformation controller 25 and the configuration of the deformer 22.

As illustrated in FIG. 16, the deformer 22 includes a pair of first guides 37a and 37b at positions more proximal to the opening 32a than the positions on both sides of the driving mechanisms 21a and 21b in the Y-axis directions are. The first guides 37a and 37b are arranged with a gap therebetween larger than the distance between the driving mechanisms 21a and 21b. The first guide 37a is more proximal to the positive side in the Y-axis directions than the driving mechanism 21a is. The first guide 37b is more proximal to the negative side in the Y-axis directions than the driving mechanism 21b is.

The first guides 37a and 37b are each made of a columnar member extending in a direction parallel to the Z axis, for example, and mounted on the inner surface of the housing 32. The first guide 37a is in contact with the tethering member 31 on the outer surface more proximal to the positive side in the Y-axis directions than the central axis of the first guide 37a is, while the driving mechanism 21a is spreading the tethering member 31 to the outside of the housing 32 or retracting the tethering member 31 to the inside of the housing 32. The first guide 37b is in contact with the tethering member 31 on the outer surface more proximal to the negative side in the Y-axis directions than the central axis of the first guide 37b is, while the driving mechanism 21b is spreading the tethering member 31 to the outside of the housing 32 or retracting the tethering member 31 to the inside of the housing 32.

The driving mechanism controller 24, when the spacecraft 1 arrives at an area of possible capturing of the artificial space object 100, causes the driving mechanisms 21a and 21b to start spreading the tethering member 31, as in Embodiment 1. The driving mechanism 21a spreads the tethering member 31 unwound from the retaining member 33a to the outside of the housing 32, along the outer surface more proximal to the positive side in the Y-axis directions than the central axis of the first guide 37a is. The driving mechanism 21b spreads the tethering member 31 unwound from the retaining member 33b to the outside of the housing 32, along the outer surface more proximal to the negative side in the Y-axis directions than the central axis of the first guide 37b is.

Figure 17:
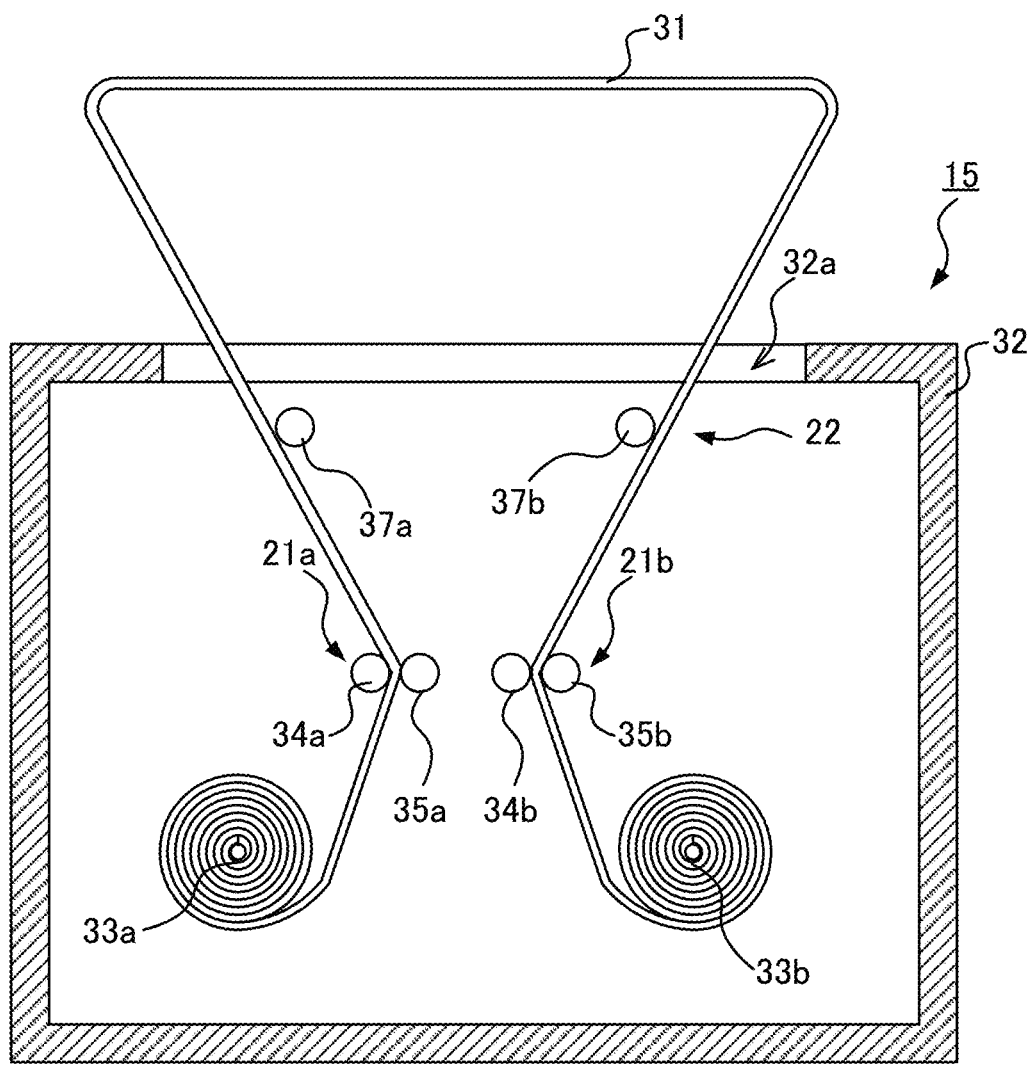
FIG. 17 is another sectional view of the capturing device according to Embodiment 2.

The first guides 37a and 37b have a Y-axis distance therebetween larger than the Y-axis distance between the driving mechanisms 21a and 21b. The first guide 37a is more proximal to the positive side in the Y-axis directions than the driving mechanism 21a is, and the first guide 37b is more proximal to the negative side in the Y-axis directions than the driving mechanism 21b is. The first guides 37a and 37b having this arrangement are in contact with the tethering member 31 and buckle the tethering member 31, as illustrated in FIG. 17. In detail, the tethering member 31 is spread to the outside of the housing 32 while being pushed outward in the Y-axis directions to have a larger maximum distance between the segments than that in the state illustrated in FIG. 16. In other words, the first guides 37a and 37b deform parts of the tethering member 31 in directions for expanding the area surrounded by the tethering member 31. In accordance with an increase in the length of the tethering member 31 that has been spread to the outside of the housing 32, one of the two buckled segments of the tethering member 31 moves toward the positive side in the Y-axis directions whereas the other buckled segment moves toward the negative side in the Y-axis directions.

This process is followed by displacement of the spacecraft 1 as in Embodiment 1. The driving mechanism controller 24 then causes the driving mechanisms 21a and 21b to retract the tethering member 31 to the inside of the housing 32, thus achieving capturing of the artificial space object 100.

As described above, the capturing device 15 according to Embodiment 2 includes the first guides 37a and 37b, and can thus capture the artificial space object 100 with a simpler structure without the deformation controller 25.

Embodiment 3

Although the tethering member 31 in Embodiments 1 and 2 is made of a single member, the tethering member 31 may also be made of multiple members. The description of Embodiment 3 is directed to a capturing device 16 including the tethering member 31 made of multiple metal members. The spacecraft 1 according to Embodiment 3 has the configurations and operations similar to those of the spacecraft 1 according to Embodiment 1. The capturing device 16 of the spacecraft 1 according to Embodiment 3 has basically the same configuration as the capturing device 15 of the spacecraft 1 according to Embodiment 2, except for the configurations of the tethering member 31 and the deformer 22.

Figure 18:
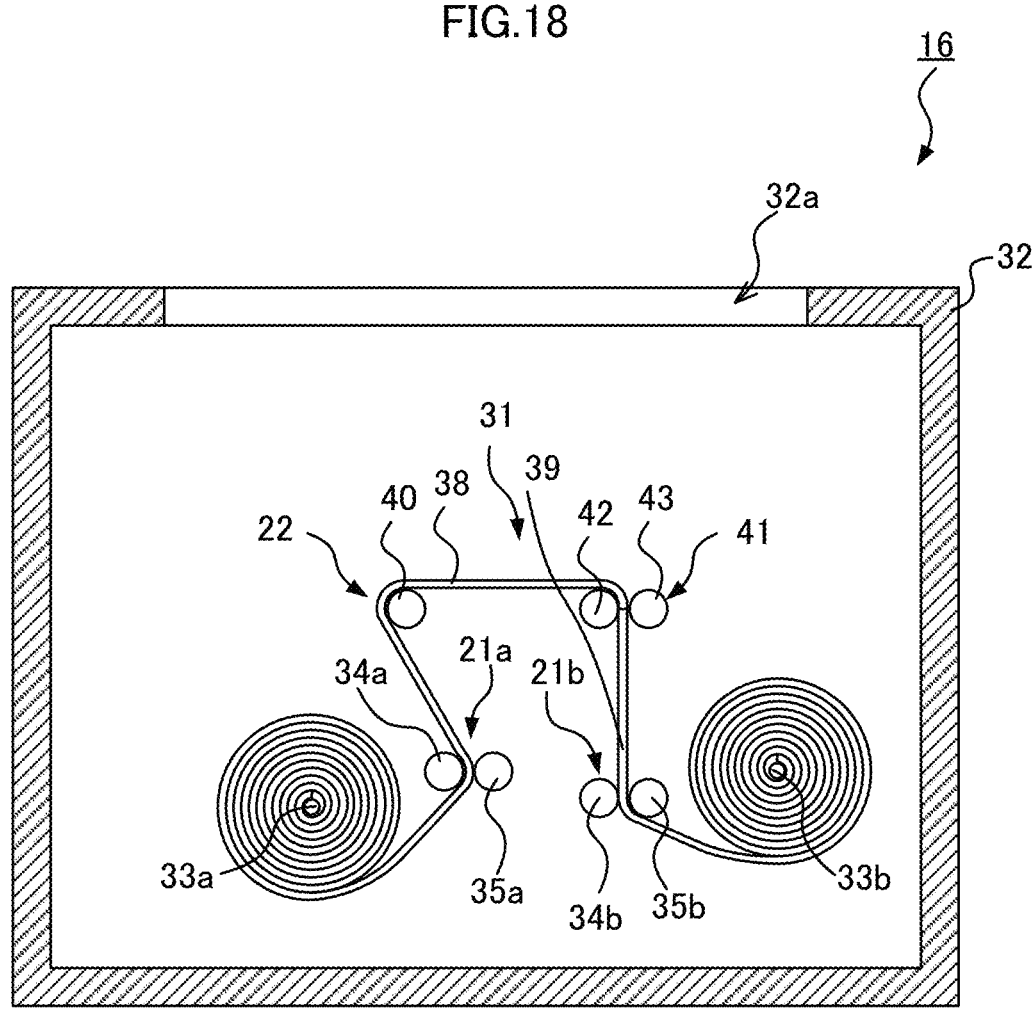
FIG. 18 is a sectional view of a capturing device according to Embodiment 3.

As illustrated in FIG. 18, the tethering member 31 of the capturing device 16 according to Embodiment 3 is made of a first metal member 38 and a second metal member 39 having a higher rigidity than the first metal member 38. The first metal member 38 and the second metal member 39 are made of convex springs having mutually different rigidities, for example. One end of the first metal member 38 is coupled to one end of the second metal member 39 with leaf springs, which are not illustrated. In detail, the one end of the first metal member 38 is held between one ends of thin leaf springs stacked on each other, and the one end of the second metal member 39 is held between the other ends of the stacked thin leaf springs.

The other end of the first metal member 38 is fixed to the retaining member 33a, and the first metal member 38 is partially wound around the retaining member 33a. The other end of the second metal member 39 is fixed to the retaining member 33b, and the second metal member 39 is partially wound around the retaining member 33b.

The driving mechanism 21a spreads the first metal member 38 to the outside of the housing 32 or retracts the first metal member 38 to the inside of the housing 32, while holding the first metal member 38. The driving mechanism 21b spreads the second metal member 39 to the outside of the housing 32 or retracts the second metal member 39 to the inside of the housing 32, while holding the second metal member 39.

The deformer 22 includes second guides 40 and 41 disposed at positions more proximal to the opening 32a than the driving mechanisms 21a and 21b are. The second guides 40 and 41 guide a part of the first metal member 38 in a direction away from the second metal member 39. The second guides 40 and 41 are arranged with a gap therebetween larger than the distance between the driving mechanisms 21a and 21b. In detail, the second guide 40 is more proximal to the positive side in the Y-axis directions than the driving mechanism 21a is. The second guide 40 is made of a columnar member extending in a direction parallel to the Z axis, for example, and mounted on the inner surface of the housing 32. The second guide 40 is in contact with the first metal member 38 on the outer surface more proximal to the positive side in the Y-axis directions than the central axis of the second guide 40 is, while the driving mechanism 21a is spreading the first metal member 38 to the outside of the housing 32 or retracting the first metal member 38 to the inside of the housing 32.

The second guide 41 includes a pair of rollers 42 and 43 provided to the housing 32 such that the rollers 42 and 43 are rotatable in accordance with rotation of the driving mechanism 21b. The pair of rollers 42 and 43 guide the second metal member 39, which is being unwound from the retaining member 33b by the driving mechanism 21b, toward the positive side in the X-axis directions while holding the second metal member 39 between the rollers 42 and 43. The pair of rollers 42 and 43 also guide the second metal member 39, which is being wound around the retaining member 33b by the driving mechanism 21b, toward the negative side in the X-axis directions while holding the second metal member 39 between the rollers 42 and 43.

Figure 19:
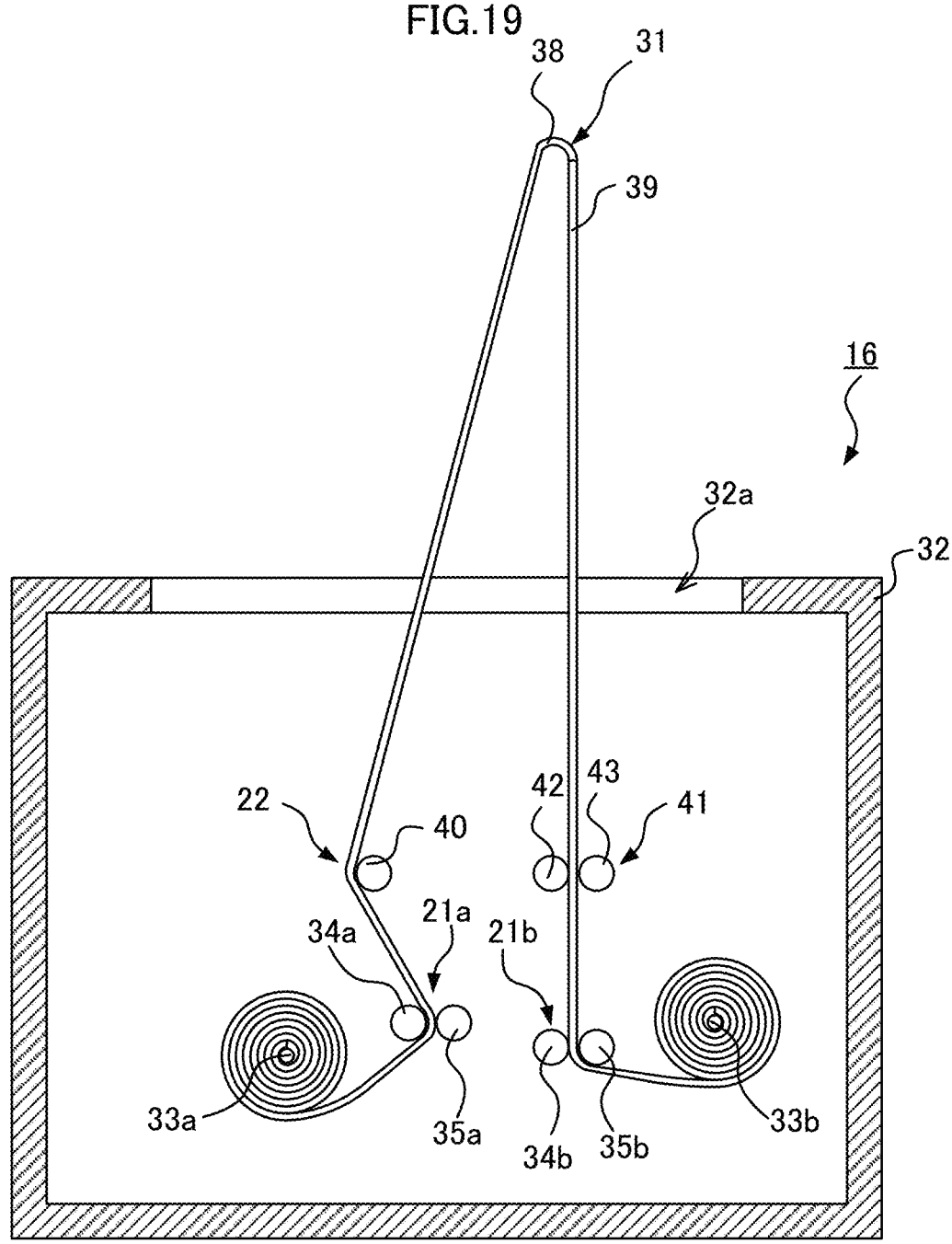
FIG. 19 is another sectional view of the capturing device according to Embodiment 3.

The driving mechanism controller 24, when the spacecraft 1 arrives at an area of possible capturing of the artificial space object 100, causes the driving mechanisms 21a and 21b to start spreading the first metal member 38 and the second metal member 39, as in Embodiment 1. As illustrated in FIG. 19, the driving mechanism 21a spreads the first metal member 38 unwound from the retaining member 33a, to the outside of the housing 32, along the outer surface more proximal to the positive side in the Y-axis directions than the central axis of the second guide 40 is. The driving mechanism 21b spreads the second metal member 39 unwound from the retaining member 33b to the outside of the housing 32, through the gap between the pair of rollers 42 and 43 of the second guide 41.

The driving mechanism controller 24, when the length of the second metal member 39 that has been spread to the outside of the housing 32 reaches a second spread length defined by the shape and the size of the artificial space object 100, stops the driving mechanism 21b. The second spread length is shorter than the target spread length, and equal to a value calculated by multiplying the target spread length by a value of 0.5, for example. The driving mechanism controller 24 then operates the driving mechanism 21a alone, and continuously spreads the first metal member 38 alone to the outside of the housing 32 until the sum of the length of the first metal member 38 and the length of the second metal member 39 that have been spread to the outside of the housing 32 reaches the target spread length.

Figure 20:
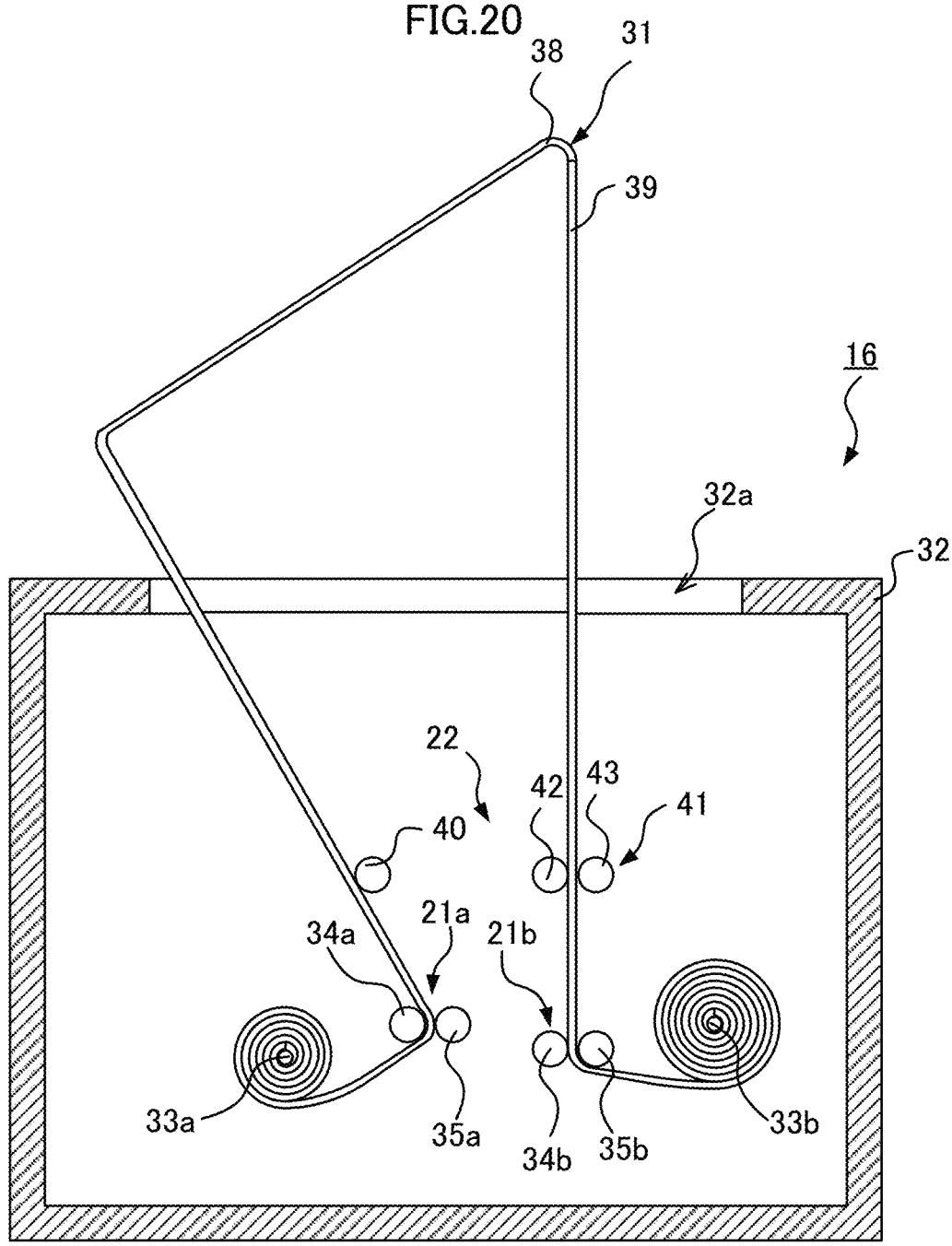
FIG. 20 is another sectional view of the capturing device according to Embodiment 3.

The first metal member 38 is spread to the outside of the housing 32 along the outer surface more proximal to the positive side in the Y-axis directions than the central axis of the second guide 40 is, which is more proximal to the positive side in the Y-axis directions than the driving mechanism 21a is. In contrast, the second metal member 39 extends in the X-axis directions through the gap between the pair of rollers 42 and 43 of the second guide 41. The second metal member 39 has a rigidity higher than the first metal member 38, and is not deformed by a force received from the first metal member 38 during spreading of the first metal member 38. The operation of the driving mechanism 21a alone thus buckles the first metal member 38 in the middle, as illustrated in FIG. 20, and makes the Y-axis distance between the first metal member 38 and the second metal member 39 larger than that in the state illustrated in FIG. 18. In other words, the second guides 40 and 41 deform a part of the tethering member 31 in a direction for expanding the area surrounded by the tethering member 31.

This process is followed by displacement of the spacecraft 1 as in Embodiment 1. The driving mechanism controller 24 then causes the driving mechanisms 21a and 21b to retract the tethering member 31 to the inside of the housing 32. In detail, the driving mechanism controller 24 causes the driving mechanism 21a to wind the first metal member 38, and then causes the driving mechanisms 21a and 21b to wind the first metal member 38 and the second metal member 39. These operations can achieve capturing of the artificial space object 100.

As described above, the capturing device 16 according to Embodiment 3 includes the second guides 40 and 41, spreads the tethering member 31 made of the first metal member 38 and the second metal member 39 to the outside of the housing 32 or retracts the tethering member 31 to the inside of the housing 32. The capturing device 16 can thus capture the artificial space object 100 with a simpler structure without the deformation controller 25.

Embodiment 4

The configurations of the deformer 22 in Embodiments 1 to 3 are mere examples and may be replaced with any configuration capable of expanding the tethering member 31 to a sufficiently large size to surround the artificial space object 100. The description of Embodiment 4 is directed to a capturing device 17 including the deformer 22 provided with an extending-contracting mechanism unlike Embodiments 1 to 3. The spacecraft 1 according to Embodiment 4 has the configurations and operations similar to those of the spacecraft 1 according to Embodiment 1. The capturing device 17 of the spacecraft 1 according to Embodiment 4 has basically the same configuration as the capturing device 15 of the spacecraft 1 according to Embodiment 2, except for the configurations of the driving mechanism 21b and the deformer 22.

As illustrated in FIG. 21, the driving mechanism 21b includes an extending-contracting mechanism 44 extendable and contractible in the direction extending through the opening 32a, that is, in the X-axis direction. The extending-contracting mechanism 44 is provided to the housing 32 such that the extending-contracting mechanism 44 is extendable and contractible in the X-axis directions. For example, the extending-contracting mechanism 44 includes a frame provided to the housing 32, a linear actuator accommodated in the frame and extendable and contractible in the X-axis directions under the control of the driving mechanism controller 24, and an extending-contracting member deformable in accordance with the extension and contraction of the linear actuator. The extending-contracting mechanism 44 has a sufficiently high rigidity not to be deformed by a force received from the tethering member 31 during spreading of the tethering member 31 to the outside of the housing 32 or retraction of the tethering member 31 to the inside of the housing 32.

The retaining member 33b is attached to an end of the tethering member 31. In detail, the retaining member 33b holds the end of the tethering member 31. The retaining member 33b is also attached to one end of the extending-contracting member of the extending-contracting mechanism 44 in the directions of extension and contraction.

The deformer 22 includes a third guide 45 disposed at a position more proximal to the opening 32a than the driving mechanisms 21a and 21b are. The third guide 45 guides the tethering member 31 in a direction away from the driving mechanism 21b. The third guide 45 is made of a columnar member extending in a direction parallel to the Z axis, and is provided to the housing 32.

The third guide 45 is in contact with the tethering member 31 on the outer surface more proximal to the positive side in the Y-axis directions than the central axis of the third guide 45 is and on the outer surface more proximal to the positive side in the X-axis directions than the central axis of the third guide 45 is, while the driving mechanism 21a is spreading the tethering member 31 to the outside of the housing 32 or retracting the tethering member 31 to the inside of the housing 32.

Figure 22:
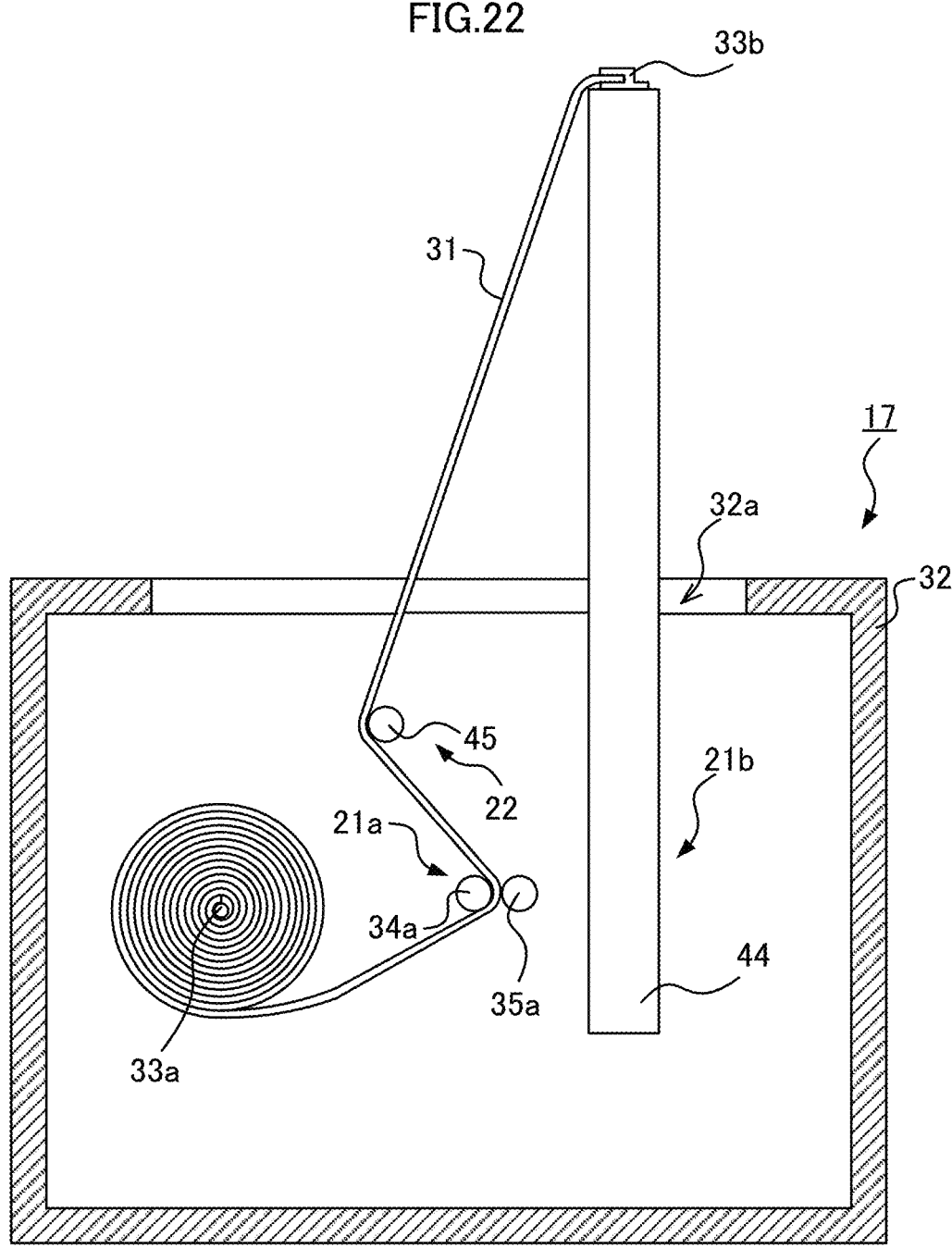
FIG. 22 is another sectional view of the capturing device according to Embodiment 4.

The driving mechanism controller 24, when the spacecraft 1 arrives at an area of possible capturing of the artificial space object 100, causes the driving mechanism 21a and the extending-contracting mechanism 44 to start spreading the tethering member 31, as in Embodiment 1. In detail, as illustrated in FIG. 22, the driving mechanism controller 24 causes the extending-contracting mechanism 44 to extend toward the positive side in the X-axis directions. In the example illustrated in FIG. 22, the extending-contracting mechanism 44 protrudes to the outside of the housing 32 through the opening 32a. The driving mechanism controller 24 causes the driving mechanism 21a to unreel the tethering member 31 from the retaining member 33a and spread the tethering member 31 to the outside of the housing 32, in accordance with the extension of the extending-contracting mechanism 44.

The driving mechanism controller 24, when the length of the extending-contracting mechanism 44 that has been extended reaches a target extension length defined by the shape and the size of the artificial space object 100, stops the extending-contracting mechanism 44. In detail, the driving mechanism controller 24 detects the extended length of the extending-contracting mechanism 44, on the basis of a value measured at a sensor, which is not illustrated, for detecting the extended length of the linear actuator of the extending-contracting mechanism 44. The driving mechanism controller 24 causes the extending-contracting mechanism 44 to extend until the detected length of the extending-contracting mechanism 44 reaches the target extension length. The driving mechanism controller 24 then operates the driving mechanism 21a alone, and causes the driving mechanism 21a to continuously spread the tethering member 31 to the outside of the housing 32 until the length of the tethering member 31 that has been spread to the outside of the housing 32 reaches the target spread length.

Figure 23:
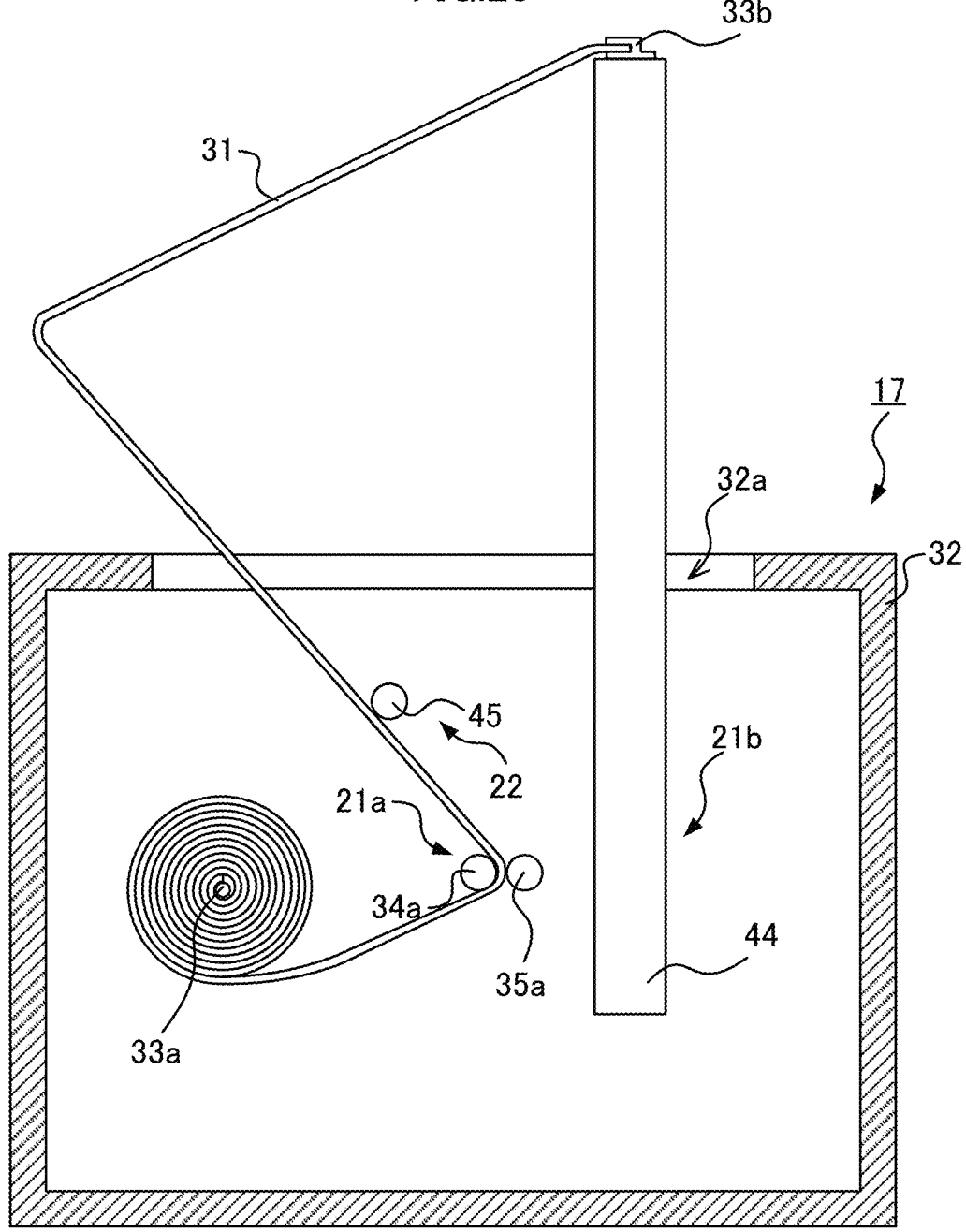
FIG. 23 is another sectional view of the capturing device according to Embodiment 4.

Although the end of the tethering member 31 attached to the extending-contracting member of the extending-contracting mechanism 44 shifts in the X-axis directions, the tethering member 31 is spread to the outside of the housing 32 along the outer surface more proximal to the positive side in the Y-axis directions than the central axis of the third guide 45 is. The extending-contracting mechanism 44 is not deformed by a force received from the tethering member 31 during spreading of the tethering member 31. The operation of the driving mechanism 21a alone thus buckles the tethering member 31 in the middle, as illustrated in FIG. 23, and makes the maximum distance between the tethering member 31 and the extending-contracting mechanism 44 larger than that in the state illustrated in FIG. 22. In other words, the third guide 45 deforms a part of the tethering member 31 in a direction for expanding the area surrounded by the tethering member 31.

This process is followed by displacement of the spacecraft 1 as in Embodiment 1. The driving mechanism controller 24 then causes the driving mechanisms 21a and 21b to retract the tethering member 31 to the inside of the housing 32. In detail, the driving mechanism controller 24 causes the driving mechanism 21a to wind the tethering member 31, and then contracts the extending-contracting mechanism 44 while causing the driving mechanism 21a to wind the tethering member 31. These operations cause the artificial space object 100 to be surrounded by the tethering member 31, the extending-contracting mechanism 44, and the housing 32, and thus captured.

As described above, the capturing device 17 according to Embodiment 4 includes the driving mechanism 21b including the extending-contracting mechanism 44 and the third guide 45, and can thus capture the artificial space object 100 with a simpler structure without the deformation controller 25.

The above-described embodiments are not to be construed as limiting the scope of the present disclosure. The area surrounded by the tethering member 31 may be expanded by any procedure other than those in the above-described examples. In one exemplary modification, the rotary mechanism 36 of the deformer 22 of the capturing device 14 may have a rectangular parallelepiped shape extending in the Z-axis directions and having rounded corners. In another exemplary modification, the deformer 22 of the capturing device 14 may include an extending-contracting mechanism 46 extendable and contractible in the Y-axis directions, as illustrated in FIG. 24. The extending-contracting mechanism 46 is disposed at a position more proximal to the opening 32a than the driving mechanisms 21a and 21b are. The extending-contracting mechanism 46 can contract to the separate state indicating separation from the tethering member 31 and extend to the contact state indicating contact with the tethering member 31 for increasing the Y-axis distance of the segments of the tethering member 31.

The deformation controller 25 in this modification causes a linear actuator included in the extending-contracting mechanism 46 to extend or contract the extending-contracting mechanism 46, for example, at timings defined by the shape and the size of the artificial space object 100 and the length of the tethering member 31 that has been spread to the outside of the housing 32.

FIG. 24 illustrates the extending-contracting mechanism 46 in the separate state, which is separate from the tethering member 31 spread by the driving mechanisms 21a and 21b. For example, the deformation controller 25 extends the deformer 22 to the contact state illustrated in FIG. 25 and thus deforms the tethering member 31, at a timing when the length of the tethering member 31 that has been spread to the outside of the housing 32 reaches a first spread length defined by the shape and the size of the artificial space object 100. In FIG. 25, the extending-contracting mechanism 46 has a Y-axis length longer than the Y-axis distance between the driving mechanisms 21a and 21b. One end of the extended extending-contracting mechanism 46 is more proximal to the positive side in the Y-axis directions than the driving mechanism 21a is, whereas the other end of the extended extending-contracting mechanism 46 is more proximal to the negative side in the Y-axis directions than the driving mechanism 21b is. This arrangement makes the Y-axis distance between the segments of the tethering member 31 larger than that in the state illustrated in FIG. 24.

In another exemplary modification, as illustrated in FIG. 26, the capturing device 15 may include a narrowing member 47 disposed between the deformer 22 and the driving mechanisms 21a and 21b. The narrowing member 47 narrows the distance between the segments of the tethering member 31 spread by the driving mechanisms 21a and 21b, and then guides the tethering member 31 to the deformer 22. The segments of the tethering member 31 are made closer to each other by the narrowing member 47 and buckled by the pair of first guides 37a and 37b of the deformer 22. The buckled segments of the tethering member 31 thus have a smaller inner angle than that in Embodiment 2.

Figure 27:
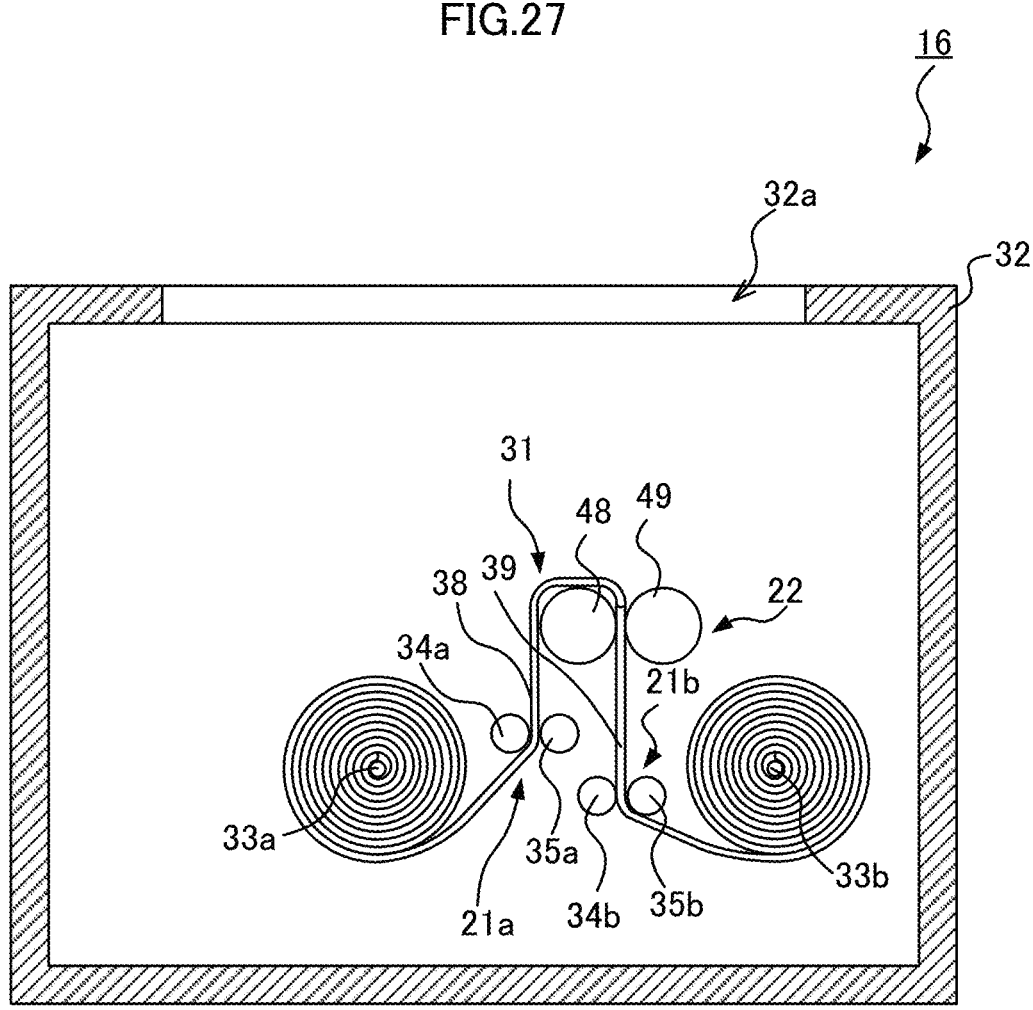
FIG. 27 is a sectional view of a third modification of the capturing device according to the embodiments.

In another exemplary modification, as illustrated in FIG. 27, the deformer 22 of the capturing device 16 may include second guides 48 and 49 to guide the second metal member 39 in the X-axis directions. The second guides 48 and 49 are each made of a columnar member extending in a direction parallel to the Z axis, for example, and provided to the housing 32. The second guides 48 and 49 guide the second metal member 39 spread by the driving mechanism 21b in the X-axis directions, while holding the second metal member 39 between the second guides 48 and 49.

The second guide 48 is in contact with the first metal member 38 on the outer surface more proximal to the positive side in the Y-axis directions than the central axis of the second guide 48 is, and is in contact with the second metal member 39 on the outer surface more proximal to the negative side in the Y-axis directions than the central axis of the second guide 48 is.

Figure 28:
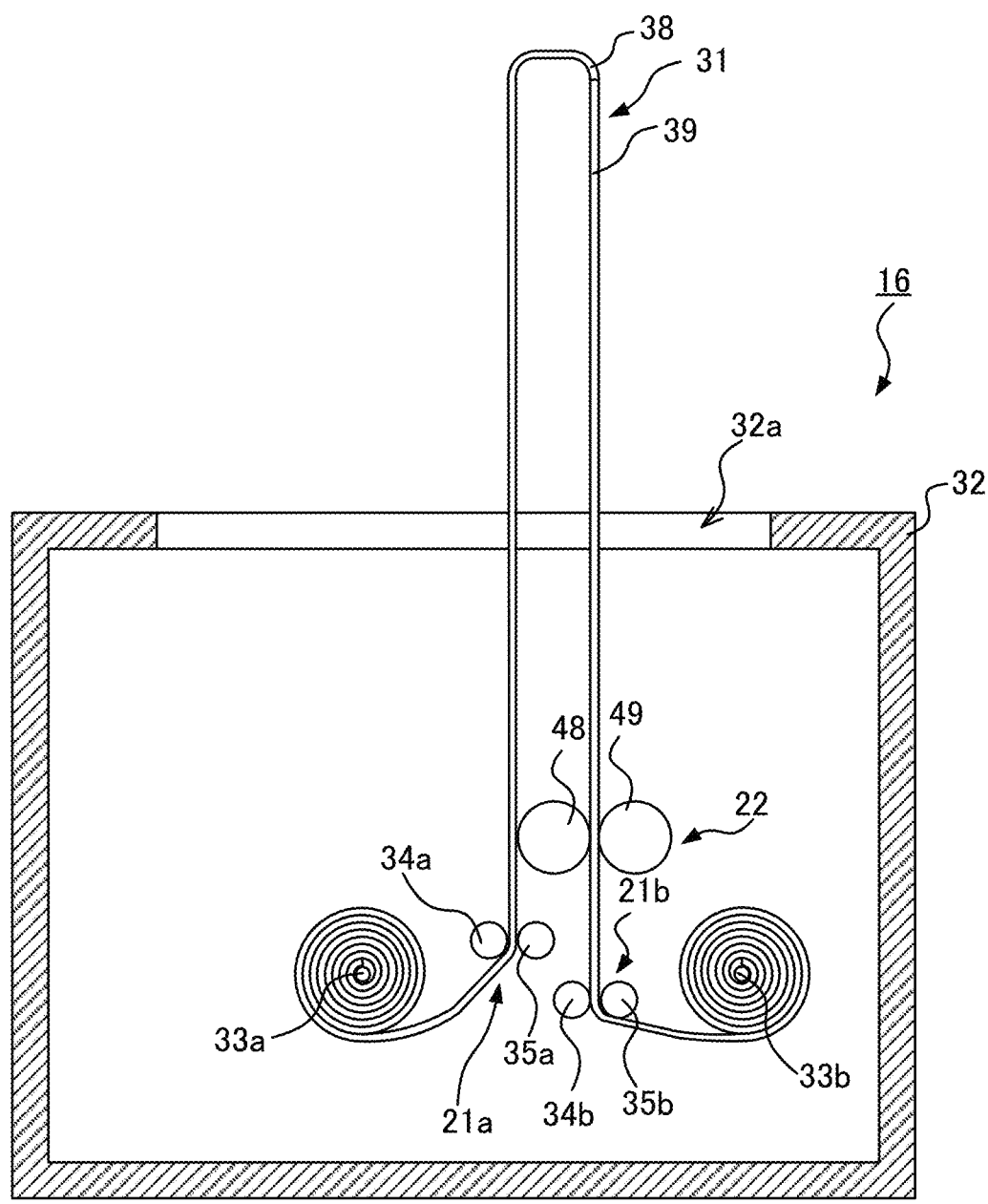
FIG. 28 is another sectional view of the third modification of the capturing device according to the embodiments.

The driving mechanism controller 24 controls the driving mechanisms 21a and 21b, as in Embodiment 1. The driving mechanism 21a spreads the first metal member 38 unwound from the retaining member 33a to the outside of the housing 32, along the outer surface more proximal to the positive side in the Y-axis directions than the central axis of the second guide 48 is. The driving mechanism 21b spreads the second metal member 39 unwound from the retaining member 33b to the outside of the housing 32, through the gap between the second guides 48 and 49. The X-axially extending segment of the first metal member 38 spread to the outside of the housing 32 and the X-axially extending segment of the second metal member 39 spread to the outside of the housing 32 are thus arranged with a gap therebetween in the Y-axis directions that is equal to the diameter of the second guide 48, as illustrated in FIG. 28.

The driving mechanism controller 24, when the length of the second metal member 39 that has been spread to the outside of the housing 32 reaches a second spread length defined by the shape and the size of the artificial space object 100, stops the driving mechanism 21*b*. The driving mechanism controller 24 then operates the driving mechanism 21*a* alone, and continuously spreads the first metal member 38 alone to the outside of the housing 32 until the sum of the length of the first metal member 38 and the length of the second metal member 39 that have been spread to the outside of the housing 32 reaches the target spread length.

Figure 29:
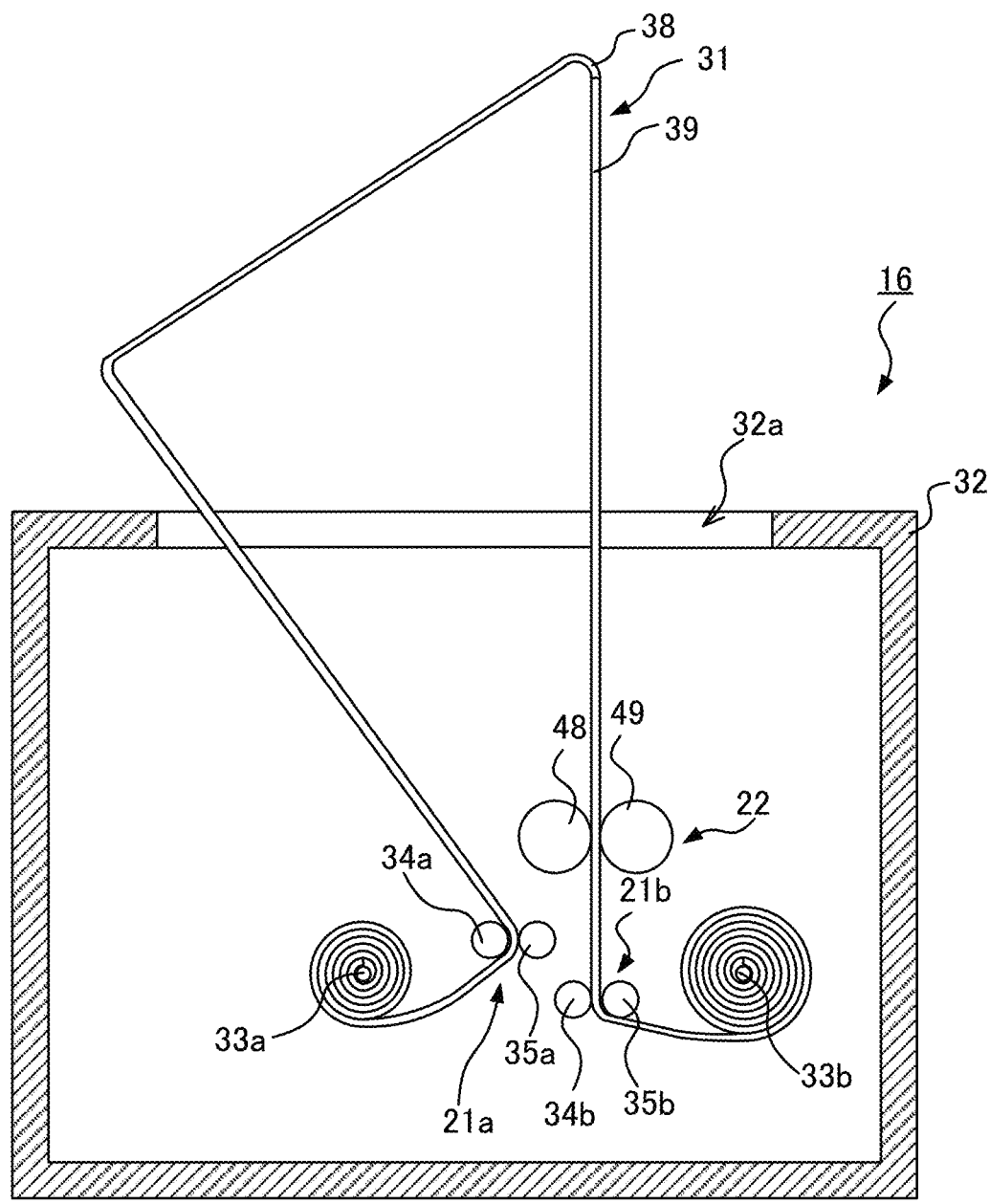
FIG. 29 is another sectional view of the third modification of the capturing device according to the embodiments.

The second metal member 39 has a rigidity higher than the first metal member 38. The second metal member 39 guided in the X-axis directions by the second guides 48 and 49 is not deformed by a force received from the first metal member 38 during spreading of the first metal member 38. The operation of the driving mechanism 21*a* alone thus buckles the first metal member 38 in the middle, as illustrated in FIG. 29, and makes the maximum Y-axis distance between the first metal member 38 and the second metal member 39 larger than that in the state illustrated in FIG. 28. In other words, the second guides 48 and 49 guide a part of the first metal member 38 in a direction away from the second metal member 39, and deform a part of the tethering member 31 in a direction for expanding the area surrounded by the tethering member 31.

Figure 30:
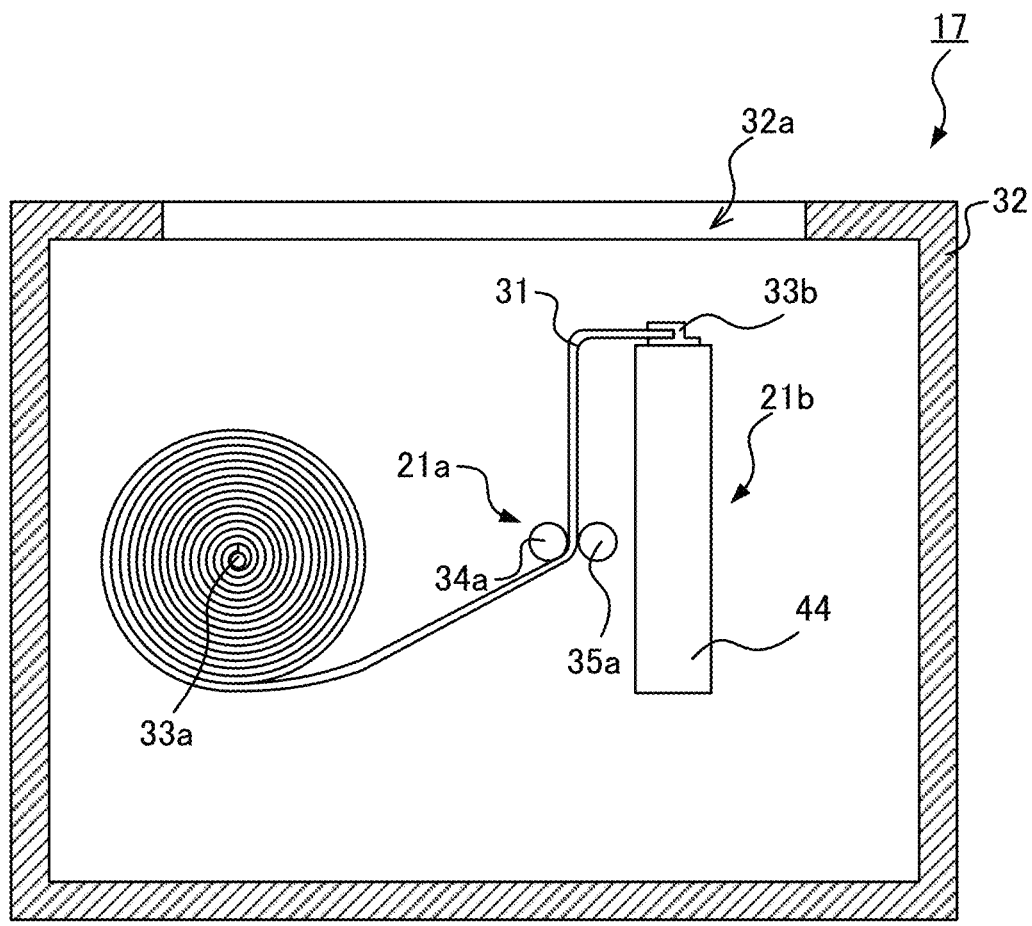
FIG. 30 is a sectional view of a fourth modification of the capturing device according to the embodiments.

In another exemplary modification, the driving mechanisms 21*a* and 21*b* of the capturing device 17 may function as the deformer 22. The capturing device 17 illustrated in FIG. 30 lacks the third guide 45, unlike the capturing device 17 according to Embodiment 4.

Figure 31:
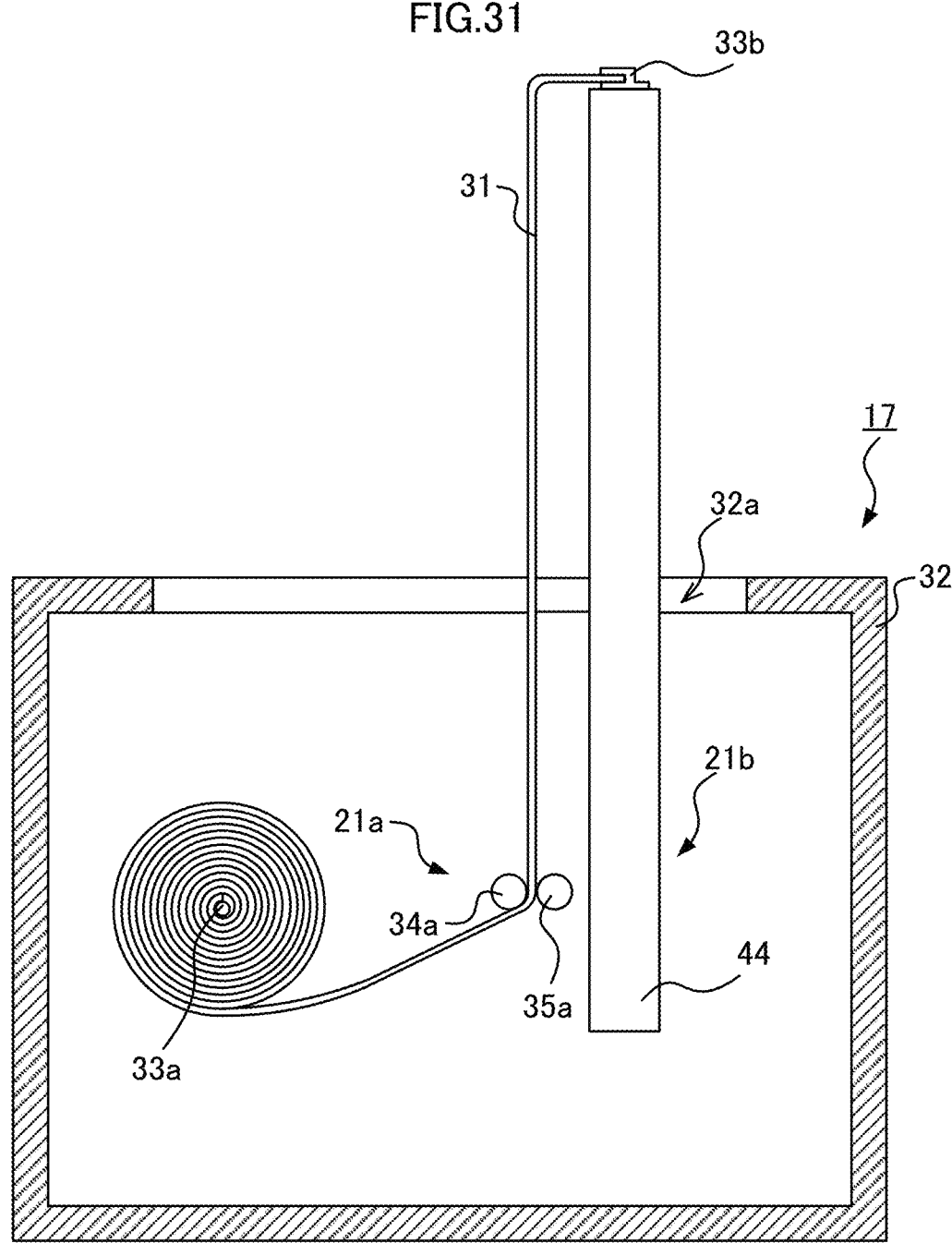
FIG. 31 is another sectional view of the fourth modification of the capturing device according to the embodiments.

As illustrated in FIG. 31, the driving mechanism controller 24 causes the extending-contracting mechanism 44 to extend toward the positive side in the X-axis directions. The driving mechanism controller 24 causes the driving mechanism 21*a* to unreel the tethering member 31 from the retaining member 33*a* and spread the tethering member 31 to the outside of the housing 32, in accordance with the extension of the extending-contracting mechanism 44.

The driving mechanism controller 24, when the length of the extending-contracting mechanism 44 that has been extended reaches a target extension length defined by the shape and the size of the artificial space object 100, stops the extending-contracting mechanism 44. The driving mechanism controller 24 then operates the driving mechanism 21*a* alone, and causes the driving mechanism 21*a* to continuously spread the tethering member 31 to the outside of the housing 32 until the length of the tethering member 31 that has been spread to the outside of the housing 32 reaches the target spread length.

Figure 32:
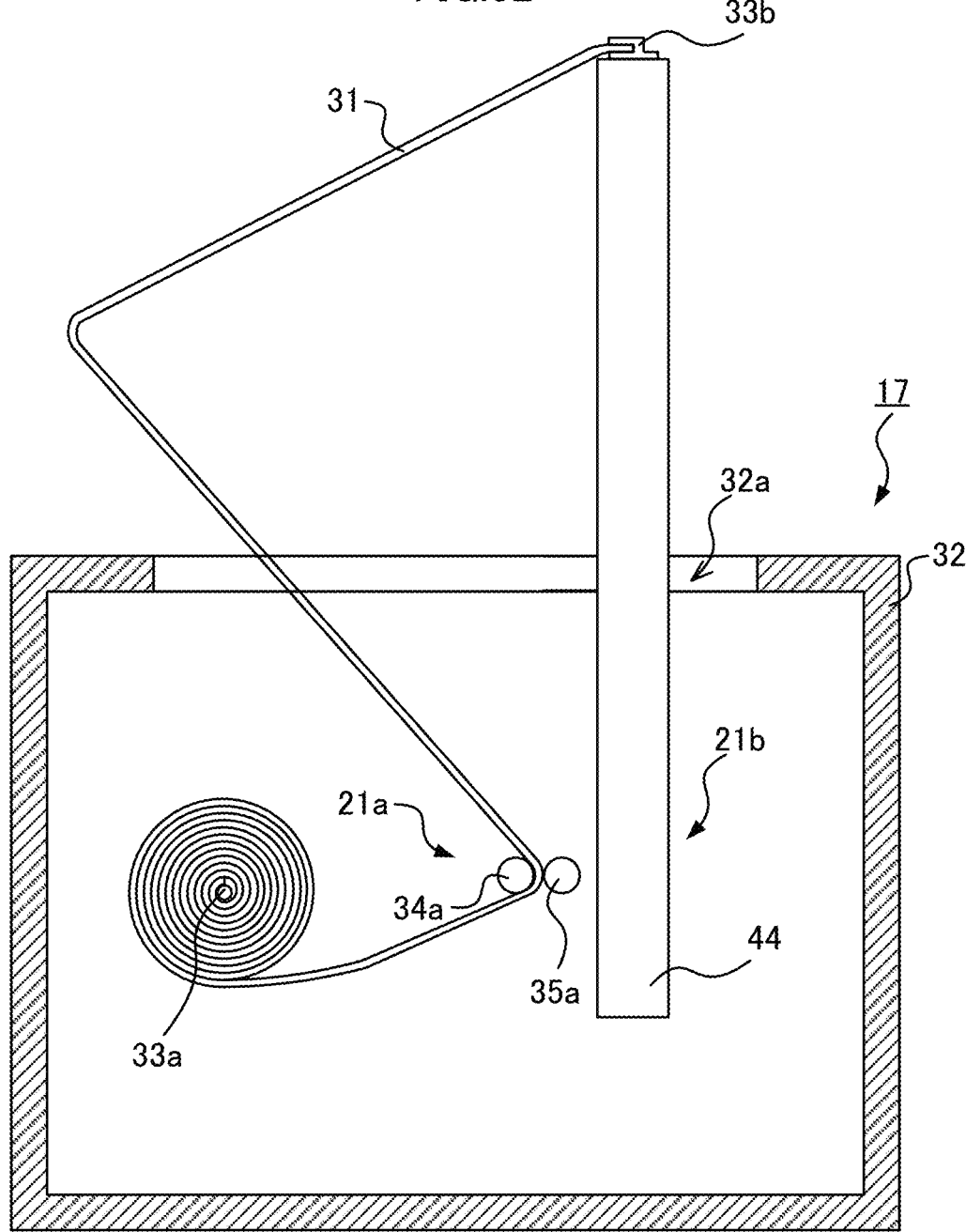
FIG. 32 is another sectional view of the fourth modification of the capturing device according to the embodiments.

The extending-contracting mechanism 44 is not deformed by a force received from the tethering member 31 during spreading of the tethering member 31. The operation of the driving mechanism 21*a* alone thus buckles the tethering member 31 in the middle, as illustrated in FIG. 32, and makes the maximum distance between the tethering member 31 and the extending-contracting mechanism 44 larger than that in the state illustrated in FIG. 31. In other words, the driving mechanisms 21*a* and 21*b* deform a part of the tethering member 31 in a direction for expanding the area surrounded by the tethering member 31.

The deformation controller 25 may detect a level of deformation of the tethering member 31 on the basis of image data taken by the on-device information acquirer 23. The deformation controller 25, when detecting an insufficient level of deformation of the tethering member 31, may further extend the extending-contracting mechanism 46 to be longer than that illustrated in FIG. 24, for example.

The on-spacecraft information acquirer 11 may acquire location information on the spacecraft 1 from a global positioning system (GPS) receiver installed in the spacecraft 1. The on-spacecraft information acquirer 11 may acquire information on the attitude of the artificial space object 100 from the ground station. The on-spacecraft information acquirer 11 may be provided by an artificial space object 100, which is a satellite capable of communication, with information, such as the location information and the attitude information on the artificial space object 100, for example.

The capturing devices 14 to 17 may each include any number of driving mechanisms 21*a* and 21*b* having any configuration. The driving mechanisms 21*a* and 21*b* may be mechanisms other than the pinch rollers. For example, the driving mechanisms 21*a* and 21*b* may each be a single roller having protrusions on the outer peripheral surface. In this case, the tethering member 31 has through holes that can receive the protrusions of the rollers. The rollers rotate while causing their protrusions to be inserted into the through holes of the tethering member 31, and thus spread the tethering member 31 to the outside of the housing 32 or retract the tethering member 31 to the inside of the housing 32.

In another exemplary modification, the driving mechanisms 21*a* and 21*b* may each be a single roller having the outer peripheral surface provided with one of a pair of tapes or elongated materials detachably attached to each other, such as one of hook and loop fasteners. In this case, the other of the hook and loop fasteners is provided to the tethering member 31.

The driving mechanisms 21*a* and 21*b* may be provided at mutually adjacent positions inside the housing 32.

The driving mechanism controller 24 may stop the driving mechanisms 21*a* and 21*b*, when the tethering member 31 has been retracted to the inside of the housing 32 by a length defined by the shape and the size of an artificial space object and by the target spread length in the retraction of the tethering member 31. In specific, the driving mechanism controller 24 may stop the driving mechanisms 21*a* and 21*b*, when the tethering member 31 has been retracted to the inside of the housing 32 by the length that implies that the artificial space object 100 is in contact with the tethering member 31 and the housing 32.

The driving mechanism controller 24 may detect the length of the tethering member 31 spread to the outside of the housing 32, on the basis of image data taken by the camera of the on-device information acquirer 23. The driving mechanism controller 24 may determine whether the artificial space object 100 has been successfully captured, on the basis of image data taken by the camera of the on-device information acquirer 23. In this case, when determining that the artificial space object 100 has been successfully captured, the driving mechanism controller 24 stops the driving mechanisms 21*a* and 21*b*.

The driving mechanism controller 24 of the capturing device 16 according to Embodiment 3 may start winding the first metal member 38 and the second metal member 39 simultaneously, in the operation for capturing the artificial space object 100.

The tethering member 31 may be made of any member other than that in the above-described examples. For one example, the tethering member 31 may be made of a shape memory alloy capable of maintaining the shape deformed by the deformer 22. For another example, the tethering member 31 may be made of carbon fiber reinforced plastics (CFRPs) having a sufficiently high rigidity not to be broken when being deformed by the deformer 22.

The tethering member 31 may have any length, other than those in the above-described examples, provided that the tethering member 31 can contribute to capturing of the artificial space object 100. For example, the tethering member 31 may be an elongated metal member having a sufficiently long length to surround an artificial space object 100 having an outer circumference of 10 m or larger. Atypical example of the sufficiently long length is 1.5 times as long as the maximum outer circumference of expected artificial space objects 100.

The retaining members 33a and 33b of the capturing devices 14 to 16 and the retaining member 33a of the capturing device 17 may each include a rotor actuator. In this case, the driving mechanism controller 24 controls the rotor actuators of the retaining members 33a and 33b in accordance with the control of the driving mechanisms 21a and 21b, and thus rotates the retaining members 33a and 33b.

The retaining members 33a and 33b may have any shape other than that in the above-described examples. For example, the retaining members 33a and 33b of the capturing devices 14 to 16 and the retaining member 33a of the capturing device 17 may have an elliptical or elongated circular section orthogonal to the Z-axis directions, and receive parts of the tethering member 31 to be wound therearound.

The spacecraft 1 may capture the artificial space object 100 with the capturing devices 14 to 17, and then enter the earth's atmosphere while holding the artificial space object 100.

The artificial space object 100 may have any shape other than that in the above-described examples. The capturing devices 14 to 17 can capture an artificial space object 100 having any shape provided that the tethering member 31 can surround the artificial space object 100.

Although the thruster controller 12 calculates a direction and a rate of ejection of the thruster 13 in the above-described embodiments, the direction and the rate of ejection of the thruster 13 may also be calculated in the ground station. In this case, the communication unit of the on-spacecraft information acquirer 11 acquires information on the direction and the rate of ejection of the thruster 13, from the ground station. The thruster controller 12 then generates a thruster control signal on the basis of the direction and the rate of ejection of the thruster 13 acquired by the on-spacecraft information acquirer 11, and transmits the thruster control signal to the thruster 13.

Figure 33:
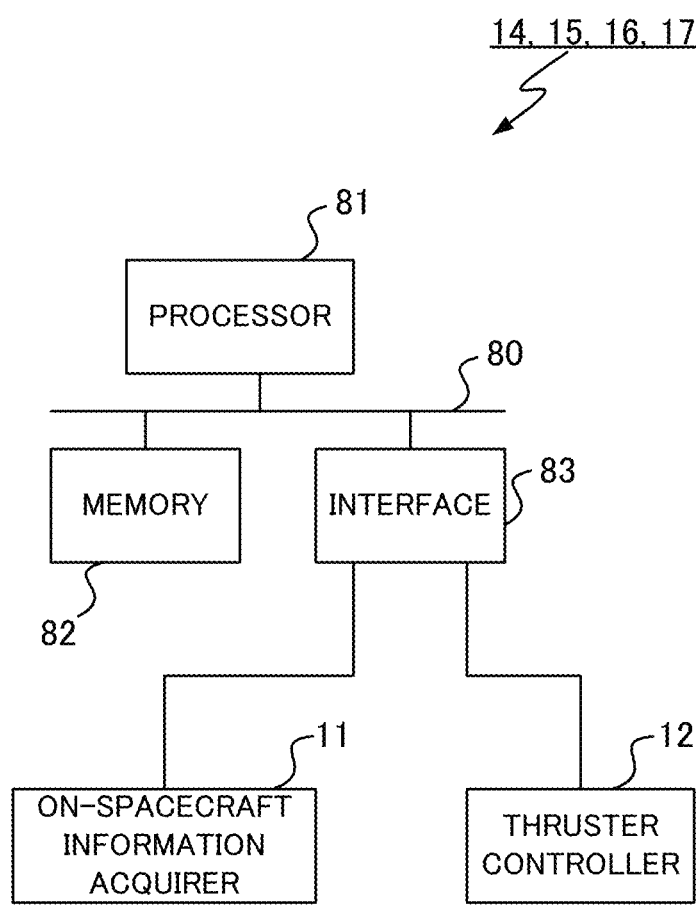
FIG. 33 illustrates a modification of the hardware configuration of the capturing device according to the embodiments.

The functions of the capturing devices 14, 15, 16, and 17 may be performed by software. The capturing devices 14, 15, 16, and 17 in this case each include a processor 81, a memory 82, and an interface 83, as illustrated in FIG. 33. The processor 81, the memory 82, and the interface 83 are connected to each other with buses 80.

The functions of the capturing devices 14, 15, 16, and 17 are performed by software, firmware, or a combination of software and firmware. The software and the firmware are described in the form of programs and stored in the memory 82. The processor 81 reads and executes the programs stored in the memory 82, and thus achieves the above-described functions of the components. That is, the memory 82 stores programs for executing operations of the capturing devices 14, 15, 16, and 17.

Examples of the memory 82 include non-volatile or volatile semiconductor memories, such as random access memory (RAM), read only memory (ROM), flash memory, erasable programmable read only memory (EPROM), and electrically erasable and programmable read only memory (EEPROM), magnetic disks, flexible disks, optical disks, compact discs, mini discs, and digital versatile discs (DVDs).

Some of the functions of the capturing devices 14, 15, 16, and 17 may be performed by dedicated hardware, whereas other functions may be performed by software or firmware. For example, the driving mechanism controller 24 and the deformation controller 25 may be achieved by the processing circuit 71 illustrated in FIG. 7, whereas the on-device information acquirer 23 may be achieved by programs stored in the memory 82 when the programs are read and executed by the processor 81 illustrated in FIG. 33.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Spacecraft
11 On-spacecraft information acquirer
12 Thruster controller
13 Thruster
14, 15, 16, 17 Capturing device
21a, 21b Driving mechanism
22 Deformer
23 On-device information acquirer
24 Driving mechanism controller
25 Deformation controller
31 Tethering member
31a Main surface
32 Housing
32a Opening
33a, 33b Retaining member
34a, 34b, 35a, 35b, 42, 43 Roller
36 Rotary mechanism
37a, 37b First guide
38 First metal member
39 Second metal member
40, 41, 48, 49 Second guide
44, 46 Extending-contracting mechanism
45 Third guide
47 Narrowing member
71 Processing circuit
72 Interface circuit
80 Bus
81 Processor
82 Memory
83 Interface
100 Artificial space object

The invention claimed is:

1. A capturing device to be installed in a spacecraft to capture an artificial space object, the capturing device comprising:
a tethering member having an elongated shape, the tethering member being stable in a first shape having a curved section orthogonal to a linear extending direction of the tethering member;
two retaining members to each retain a corresponding end of ends of the tethering member;
a housing including an opening, the housing being configured to accommodate at least a part of the tethering member and the two retaining members;
one or more driving mechanisms to spread the tethering member to an outside of the housing through the opening, or retract the tethering member to an inside of the housing;
a deformer to deform a part of the tethering member in a direction of expanding an area surrounded by the tethering member, while the tethering member is being spread by the one or more driving mechanisms; and
driving mechanism controlling circuitry to cause the one or more driving mechanisms
to spread the tethering member to the outside of the housing by a target spread length defined by at least a shape and a size of the artificial space object, and
to retract, when the artificial space object is located in the area surrounded by the tethering member, the tethering member to the inside of the housing until at least a part of the tethering member comes into contact with the artificial space object.

2. The capturing device according to claim 1, wherein the deformer buckles a part of the tethering member, and the tethering member spread to the outside of the housing has a partially buckled shape.

3. The capturing device according to claim 1, wherein the tethering member is partially wound around each of the two retaining members, and
the capturing device comprises two of the driving mechanisms provided inside the housing.

4. The capturing device according to claim 3, wherein the tethering member is accommodated inside the housing while being partially wound around each of the two retaining members, and
the tethering member is spread by the two driving mechanisms to the outside of the housing such that a U-shaped bent of the tethering member comes out first to the outside.

5. The capturing device according to claim 3, wherein the deformer is in either one of a separate state or a contact state, the separate state indicating the deformer separate from segments of the tethering member spread by the two driving mechanisms, the contact state indicating the deformer in contact with the segments of the tethering member spread by the two driving mechanisms, the deformer in the contact state being configured to make a distance between the segments of the tethering member larger than a distance between the two driving mechanisms, and
the capturing device further includes deformation controlling circuitry to cause the deformer to switch from the separate state to the contact state, when a length of the tethering member that has been spread to the outside of the housing reaches a first spread length, the first spread length being shorter than the target spread length and being defined by the shape and the size of the artificial space object.

6. The capturing device according to claim 5, wherein the deformer includes a rotary mechanism capable of rotating between a position corresponding to the separate state and a position corresponding to the contact state.

7. The capturing device according to claim 5, wherein the deformer includes an extending-contracting mechanism contractible to a position corresponding to the separate state and extendable to a position corresponding to the contact state.

8. The capturing device according to claim 3, wherein the deformer includes a pair of first guides at positions more proximal to the opening than positions on both sides of the two driving mechanisms are, the first guides being arranged with a gap therebetween larger than a distance between the two driving mechanisms, the pair of first guides being configured to be in contact with segments of the tethering member spread by the two driving mechanisms on outer surfaces.

9. The capturing device according to claim 1, wherein
the tethering member includes a first metal member and a second metal member, the second metal member being coupled to the first metal member and having a higher rigidity than a rigidity of the first metal member,
the first metal member is partially wound around one of the two retaining members, and the second metal member is partially wound around the other of the two retaining members,
the one or more driving mechanisms include two of the driving mechanisms provided inside the housing,
one of the two driving mechanisms spreads the first metal member to the outside of the housing through the opening, or retracts the first metal member to the inside of the housing, and
the other of the two driving mechanisms spreads the second metal member to the outside of the housing through the opening, or retracts the second metal member to the inside of the housing.

10. The capturing device according to claim 9, wherein the deformer includes at least one second guide to guide a part of the first metal member in a direction away from the second metal member.

11. The capturing device according to claim 1, wherein
the tethering member is partially wound around each of the two retaining members, and
the capturing device further includes a narrowing member disposed between the deformer and the one or more driving mechanisms, the narrowing member being configured to narrow a distance between segments of the tethering member unwound from the two retaining members by the one or more driving mechanisms, and then guide the tethering member to the deformer.

12. The capturing device according to claim 1, wherein
the one or more driving mechanisms include two of the driving mechanisms provided inside the housing,
one of the two retaining members is attached to one of the two driving mechanisms, and
the one of the two driving mechanisms provided with the retaining member includes an extending-contracting mechanism extendable and contractible in a direction extending through the opening.

13. The capturing device according to claim 12, wherein
the tethering member is partially wound around the other of the two retaining members, and
the deformer includes a third guide disposed at a position more proximal to the opening than the other of the two driving mechanisms is, the third guide being configured to guide, in a direction away from the one of the two driving mechanisms, the tethering member unwound from the other of the two retaining members.

14. The capturing device according to claim 1, wherein the tethering member is stable in a second shape having a rectangular section orthogonal to an extending direction while being partially wound around any of the two retaining members.

15. The capturing device according to claim 1, further comprising:
   on-device information acquiring circuitry to acquire information on the shape and the size of the artificial space object, wherein
   the one or more driving mechanisms spread the tethering member to the outside of the housing, by the target spread length of the tethering member defined by the shape and the size of the artificial space object acquired by the on-device information acquiring circuitry.

16. The capturing device according to claim 15, wherein
   the on-device information acquiring circuitry further acquires information on a positional relationship between the artificial space object and the tethering member, and
   when the positional relationship acquired by the on-device information acquiring circuitry indicates that the artificial space object is located in the area surrounded by the tethering member, the one or more driving mechanisms retract the tethering member to the inside of the housing until at least a part of the tethering member comes into contact with the artificial space object.

17. A spacecraft for capturing an artificial space object, the spacecraft comprising:
   a thruster of which a direction of ejection and a rate of ejection are controllable;
   on-spacecraft information acquiring circuitry to acquire location information on the artificial space object and location information on the spacecraft;
   thruster controlling circuitry
      to determine, based on the location information on the artificial space object and the location information on the spacecraft acquired by the on-spacecraft information acquiring circuitry, a direction of ejection and a rate of ejection of the thruster for causing the spacecraft to approach the artificial space object, and
      to control the thruster in accordance with the determined direction of ejection and the determined rate of ejection; and
   the capturing device according to claim 1.

18. The spacecraft according to claim 17, wherein
   after the one or more driving mechanisms included in the capturing device retract the tethering member to the inside of the housing until at least a part of the tethering member comes into contact with the artificial space object, the thruster controlling circuitry
      determines, based on the location information on the artificial space object and the location information on the spacecraft acquired by the on-spacecraft information acquiring circuitry, a direction of ejection and a rate of ejection of the thruster for causing the artificial space object to depart from an original orbit of the artificial space object, and
      controls the thruster in accordance with the determined direction of ejection and the determined rate of ejection.

* * * * *